US012113758B2

(12) United States Patent
Takada et al.

(10) Patent No.: US 12,113,758 B2
(45) Date of Patent: Oct. 8, 2024

(54) COMMUNICATION CONTROL APPARATUS, COMMUNICATION CONTROL METHOD, AND NON-TRANSITORY COMPUTER READABLE MEDIUM FOR CONTROLLING TRANSMISSION OF A MESSAGE THAT INCLUDES AN ATTACHED FILE

(71) Applicant: NTT Communications Corporation, Tokyo (JP)

(72) Inventors: Tomonori Takada, Kamakura (JP); Hideaki Akabori, Yokohama (JP); Tsunechika Kishida, Yokohama (JP); Yoshihiko Kobayashi, Tokyo (JP); Masataka Suzuki, Tokyo (JP); Tohru Minakuchi, Yokohama (JP)

(73) Assignee: NTT Communications Corporation, Tokyo (JP)

( * ) Notice: Subject to any disclaimer, the term of this patent is extended or adjusted under 35 U.S.C. 154(b) by 0 days.

(21) Appl. No.: 18/162,771

(22) Filed: Feb. 1, 2023

(65) Prior Publication Data
US 2023/0188487 A1 Jun. 15, 2023

Related U.S. Application Data

(63) Continuation of application No. PCT/JP2021/028958, filed on Aug. 4, 2021.

(30) Foreign Application Priority Data

Aug. 7, 2020 (JP) ................................. 2020-135100

(51) Int. Cl.
*H04L 51/063* (2022.01)
*H04L 51/08* (2022.01)
(Continued)

(52) U.S. Cl.
CPC ............ *H04L 51/063* (2013.01); *H04L 51/08* (2013.01); *H04L 51/212* (2022.05); *H04L 51/214* (2022.05)

(58) Field of Classification Search
CPC ....... H04L 51/00; H04L 51/04; H04L 51/063; H04L 51/08; H04L 51/212; H04L 51/214;
(Continued)

(56) References Cited

U.S. PATENT DOCUMENTS 8,001,609 B1 * 8/2011 Chan ................... G06Q 10/107
726/1
10,067,772 B1 * 9/2018 Ledet .................... G06F 40/166
(Continued)

FOREIGN PATENT DOCUMENTS

JP 2005-38145 A 2/2005
JP 2007-249618 A 9/2007
(Continued)

OTHER PUBLICATIONS

International Preliminary Report on Patentability and Written Opinion issued Feb. 16, 2023, in PCT/JP2021/028958, 6 pages.
(Continued)

*Primary Examiner* — Johnny B Aguiar
(74) *Attorney, Agent, or Firm* — Oblon, McClelland, Maier & Neustadt, L.L.P.

(57) ABSTRACT

A communication control apparatus according to one aspect of the present invention determines whether a message to be transmitted from an information processing apparatus include at least one attached file, when the message is transmitted from the information processing apparatus to one or more destinations via a network. When the communication control apparatus has determined that the message to be transmitted includes said at least one attached file, the communication control apparatus acquires approval of transmission of said at least one attached file from an approver, and transmits the message including said at least one attached file to said one or more destinations, on condition that approval of transmission of said at least one attached file has been received from the approver.

11 Claims, 20 Drawing Sheets

(51) Int. Cl.
*H04L 51/212* (2022.01)
*H04L 51/214* (2022.01)

(58) Field of Classification Search
CPC ......... H04L 51/23; H04L 63/10; H04L 63/08;
H04L 63/105; H04L 63/102; H04L
63/101; H04L 63/04; G06Q 10/107
See application file for complete search history.

(56) References Cited

U.S. PATENT DOCUMENTS

| | | | | |
|---|---|---|---|---|
| 2008/0060051 | A1* | 3/2008 | Lim | G06F 16/93 |
| | | | | 726/1 |
| 2010/0332975 | A1* | 12/2010 | Chang | G06Q 10/107 |
| | | | | 715/256 |
| 2011/0035454 | A1* | 2/2011 | Tsuboi | H04L 51/48 |
| | | | | 709/206 |
| 2011/0196931 | A1* | 8/2011 | Clagg | H04L 51/212 |
| | | | | 709/206 |
| 2016/0308814 | A1* | 10/2016 | Meister | H04L 51/23 |
| 2021/0157950 | A1* | 5/2021 | Turano | G06F 21/6245 |

FOREIGN PATENT DOCUMENTS

| | | | |
|---|---|---|---|
| JP | 2008197788 A | * | 8/2008 |
| JP | 2009-230170 A | | 10/2009 |
| JP | 2009-237804 A | | 10/2009 |
| JP | 2010-287245 A | | 12/2010 |
| JP | 2018-180837 A | | 11/2018 |

OTHER PUBLICATIONS

International Search Report issued Oct. 19, 2021 in PCT/JP2021/028958 filed Aug. 4, 2021, 5 pages (with English Translation).

* cited by examiner

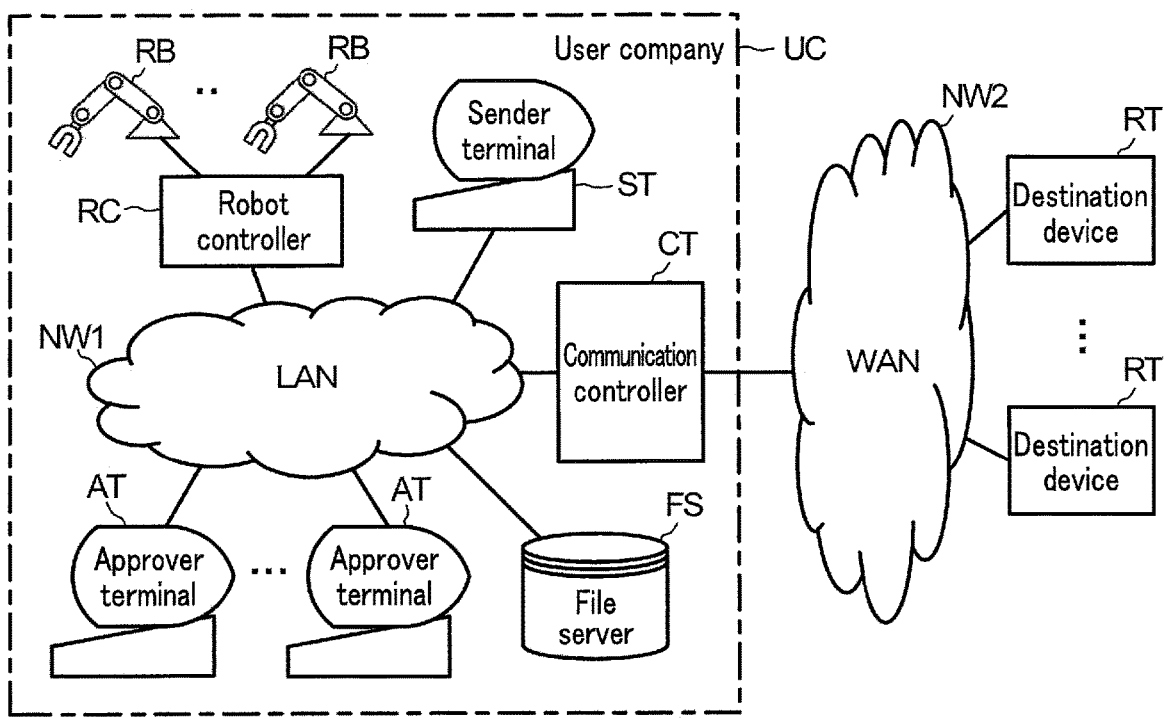
F I G. 1
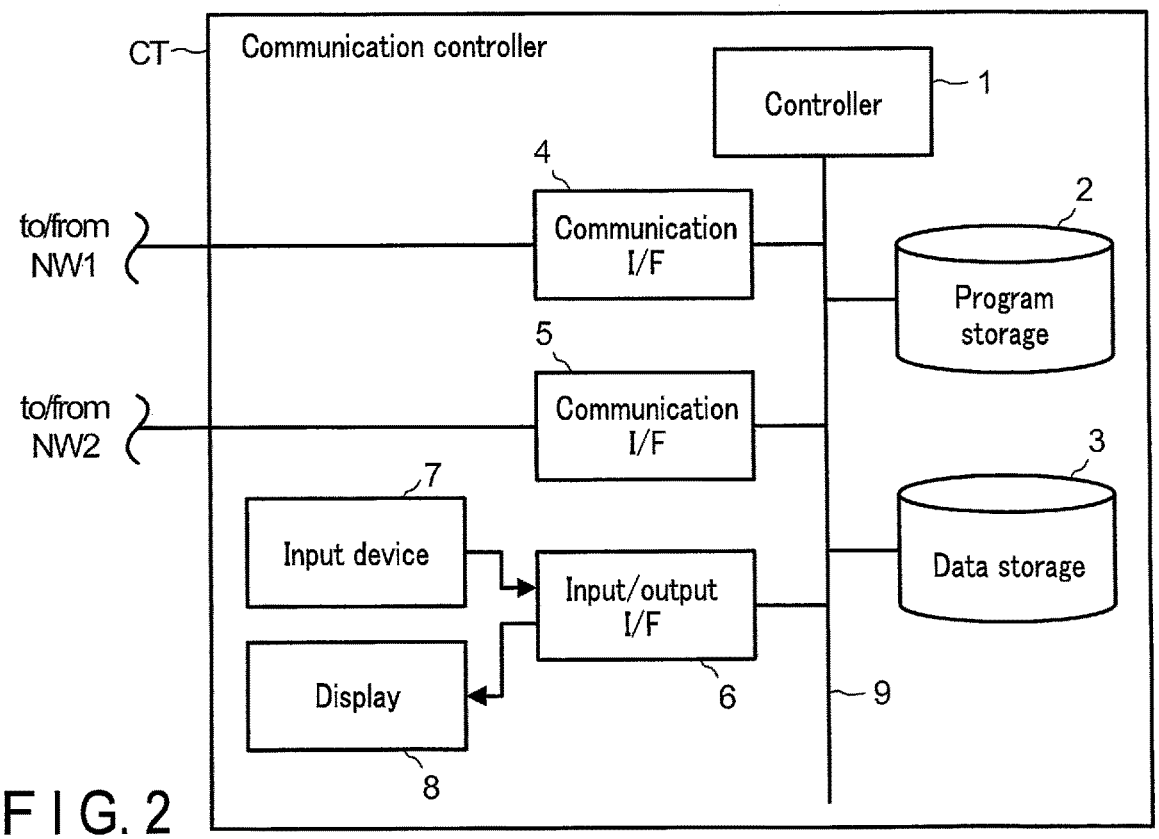
F I G. 2

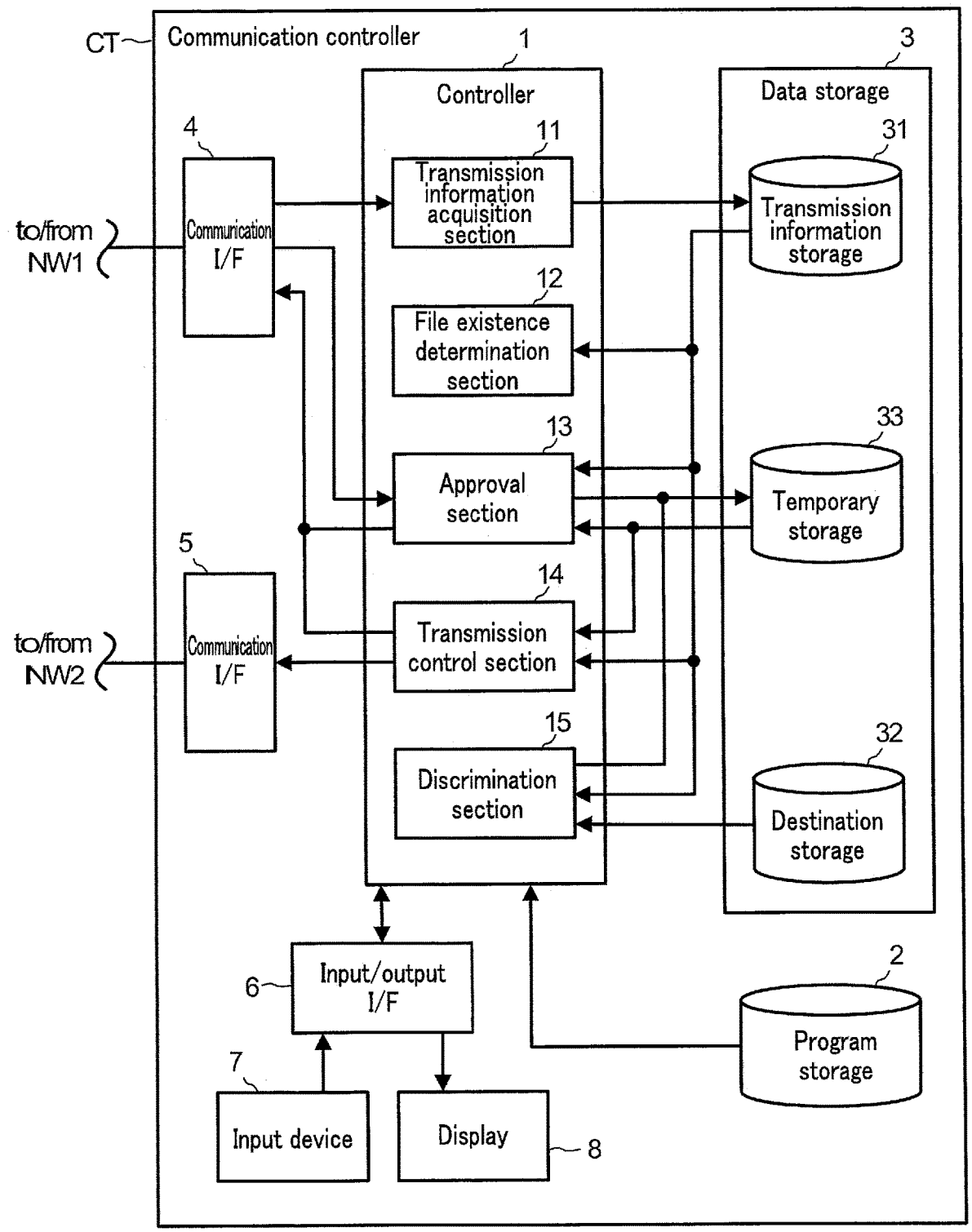
F I G. 3

| Destination ID | Destination | ... | Confidential level |
|---|---|---|---|
| 000001 | ...@Axxx.co.jp | ... | 1 |
| 000002 | ...@BBxx.co.jp | ... | 3 |
| 000003 | ...@Cxxx.co.jp | ... | 2 |
| ⋮ | ⋮ | ⋮ | ⋮ |

FIG. 4

| Confidential level | Restriction |
|---|---|
| 1 | No restriction |
| 2 | Determination is required |
| 3 | Transmission is impossible |

FIG. 5

| Destination ID | Transmission is possible / Transmission is impossible / Approval is required |
|---|---|

FIG. 6

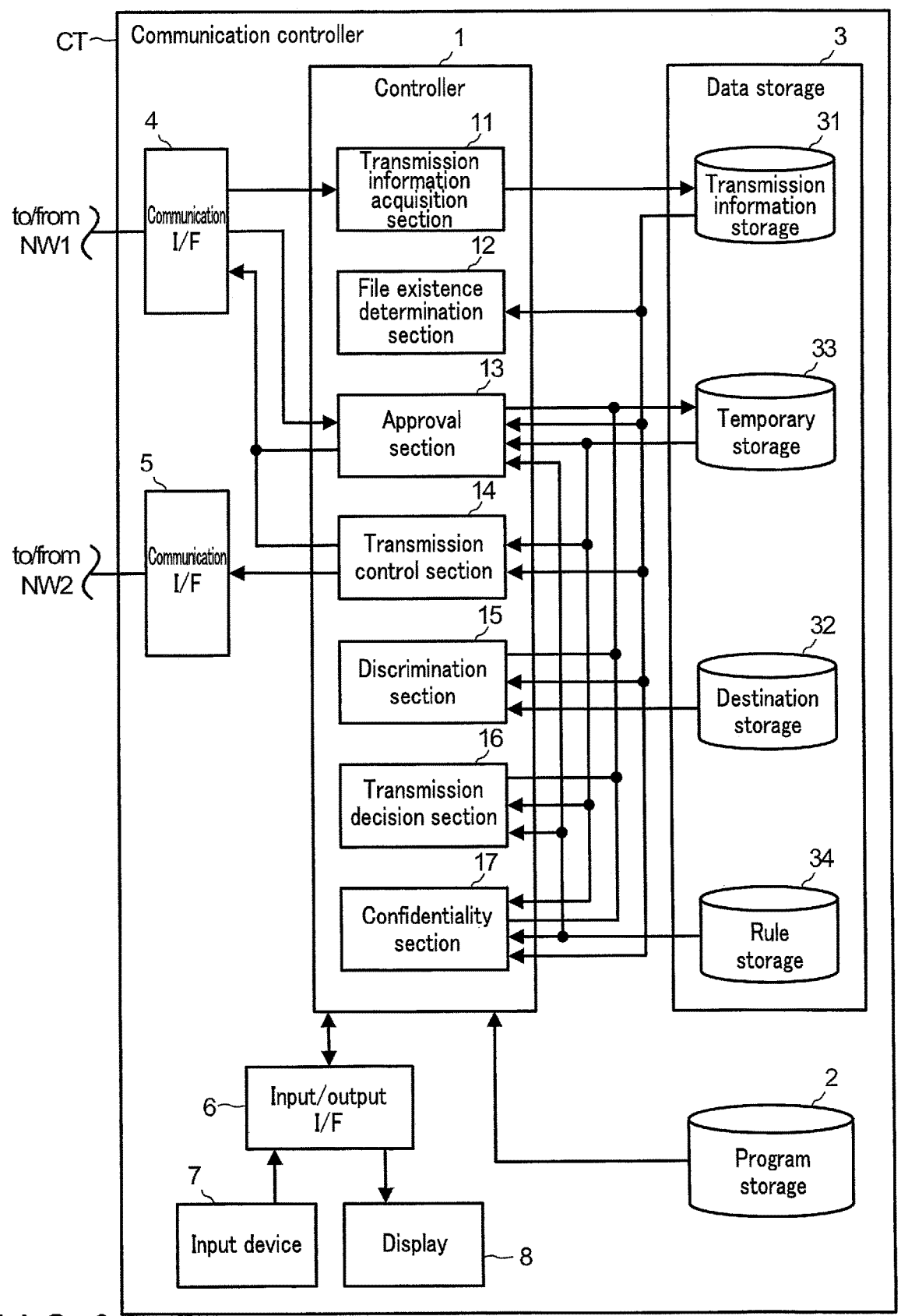
F I G. 9

| Destination ID | Destination | ... | Confidential level | Rule ID |
|---|---|---|---|---|
| 000001 | ...@Axxx.co.jp | ... | 1 | — |
| 000002 | ...@BBxx.co.jp | ... | 3 | — |
| 000003 | ...@Cxxx.co.jp | ... | 2 | 047 |
| ⋮ | ⋮ | ⋮ | ⋮ | ⋮ |

FIG. 10

| Rule ID:047 ||||
|---|---|---|---|
| Confidential word | Approval is required (approver) | Encryption is required | Transmission is impossible |
| Sales data | Superior, preparation department, ... | ○ | — |
| Drawing | Superior, design department, Intellectual property department, ... | ○ | — |
| Contact list | Superior, legal department, ... | ○ | — |
| Company secret | — | — | ○ |
| ⋮ | ⋮ | ⋮ | ⋮ |

FIG. 11

| Rule ID : 047 | | | |
|---|---|---|---|
| Confidential file | Approval is required (approver) | Encryption is required | Transmission is impossible |
| Extension : .pdf | Superior, preparation department, ... | ○ | — |
| Extension : .dwg | Superior, design department, Intellectual property department, ... | ○ | — |
| Extension : .data | — | — | ○ |
| ⋮ | ⋮ | ⋮ | ⋮ |
| File name : sales | — | ○ | — |
| File name : contract | Superior, legal department, ... | ○ | — |
| ⋮ | ⋮ | ⋮ | ⋮ |
| Preparer : DR01 | Superior, legal department, ... | ○ | — |
| ⋮ | ⋮ | ⋮ | ⋮ |
| Preparation date and time : within 24 hours | — | — | ○ |
| ⋮ | ⋮ | ⋮ | ⋮ |

F I G. 12

| Destination ID | Transmission is possible / Transmission is impossible / Approval is required | Rule ID |
|---|---|---|

FIG. 13

| File ID | Transmission is possible / Transmission is impossible / Approval is required | Encryption | Approved/ Not approved |
|---|---|---|---|

FIG. 14

| Approval destination ID |||
|---|---|---|
| File ID | Destination ID | Approved /Not approved |
| DR01−2006050023 | 000003 | |
| DR01−2006050023 | 000027 | |
| DR02−2006050022 | 000003 | |
| ⋮ | ⋮ | |

FIG. 15

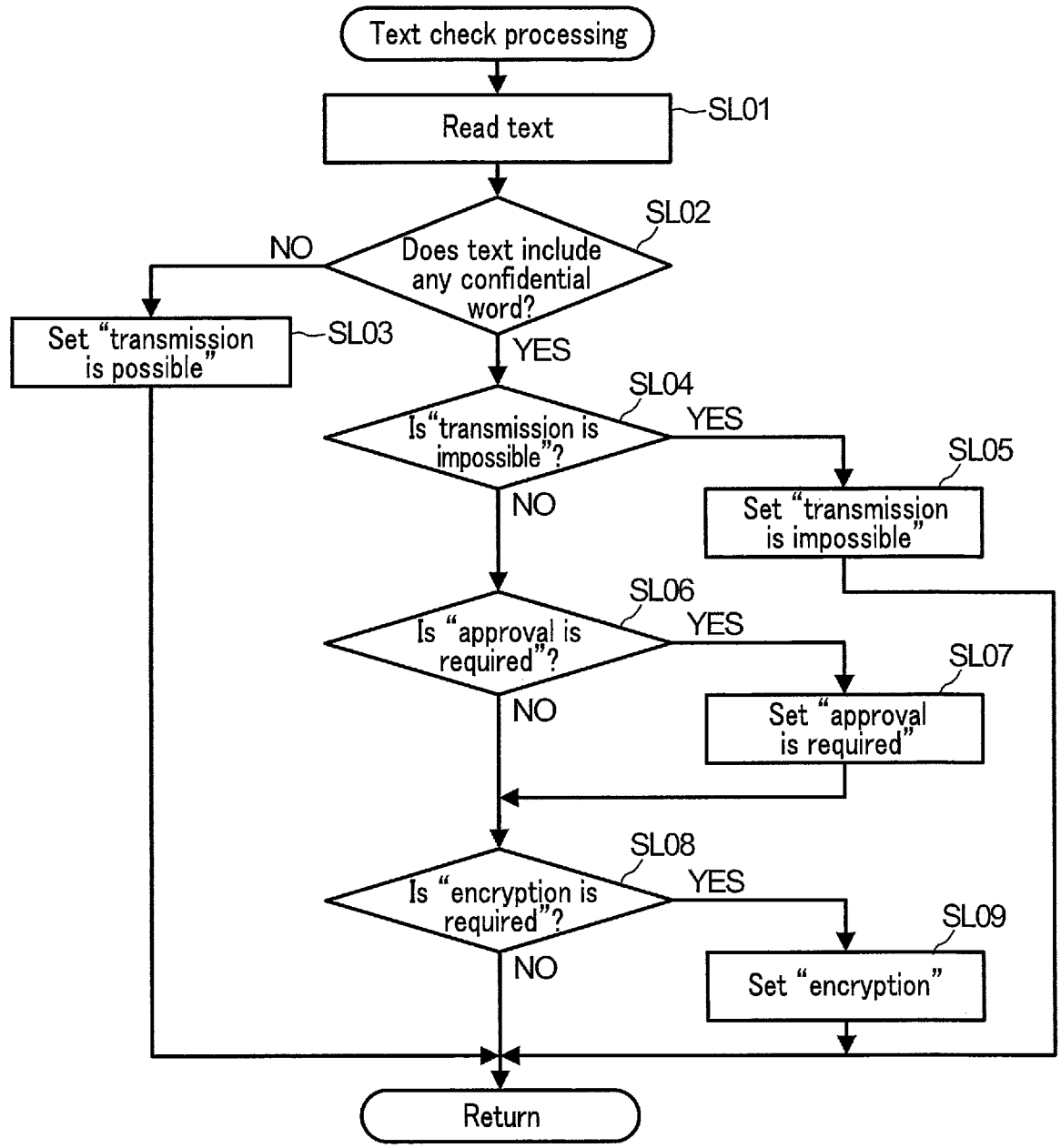
F I G. 17

| Rule ID : 047 | | | | | |
|---|---|---|---|---|---|
| Data content | Approval is required (approver) | Encryption is required | Processing is required | Deletion is required | Transmission is impossible |
| Model number : DR01 | Superior | ○ | — | — | — |
| Model number : DR55 | Superior, preparation department, ... | ○ | ○ | — | — |
| Model number : DZ** | — | — | — | — | ○ |
| ⋮ | ⋮ | ⋮ | ⋮ | ⋮ | ⋮ |
| Actual value: X-axis position | Superior, preparation department, ... | ○ | ○ | — | — |
| Actual value: X-axis current value | Superior, preparation department, ... | ○ | — | — | — |
| Actual value: Produced number | Superior, legal department, ... | — | — | ○ | — |
| ⋮ | ⋮ | ⋮ | ⋮ | ⋮ | ⋮ |
| Time : within 5 weeks | — | — | — | ○ | — |
| Time : 20:00-8:00 | — | — | — | — | ○ |
| ⋮ | ⋮ | ⋮ | ⋮ | ⋮ | ⋮ |

F I G. 20

| | Rule ID: 047 | |
|---|---|---|
| Model number: DR01 | Transmission is impossible | Preparation date and time : 20:00-8:00 |
| | Encryption is required | ○ |
| | Approval is required (approver) | Superior, preparation department, ... |
| | Data requiring processing | X-axis position, Y-axis position |
| | Data requiring deletion | Produced number |
| Model number: DR02 | Transmission is impossible | Preparation date and time . 8:00-20:00 |
| | ⋮ | ⋮ |
| ⋮ | ⋮ | ⋮ |

FIG. 21

| File ID | Transmission is possible / Transmission is impossible / approval is required | Encryption | Confidentiality is required | Approved/ Not approved |
|---|---|---|---|---|

FIG. 22

| File ID | Data requiring processing | Data requiring deletion |
|---|---|---|

FIG. 23

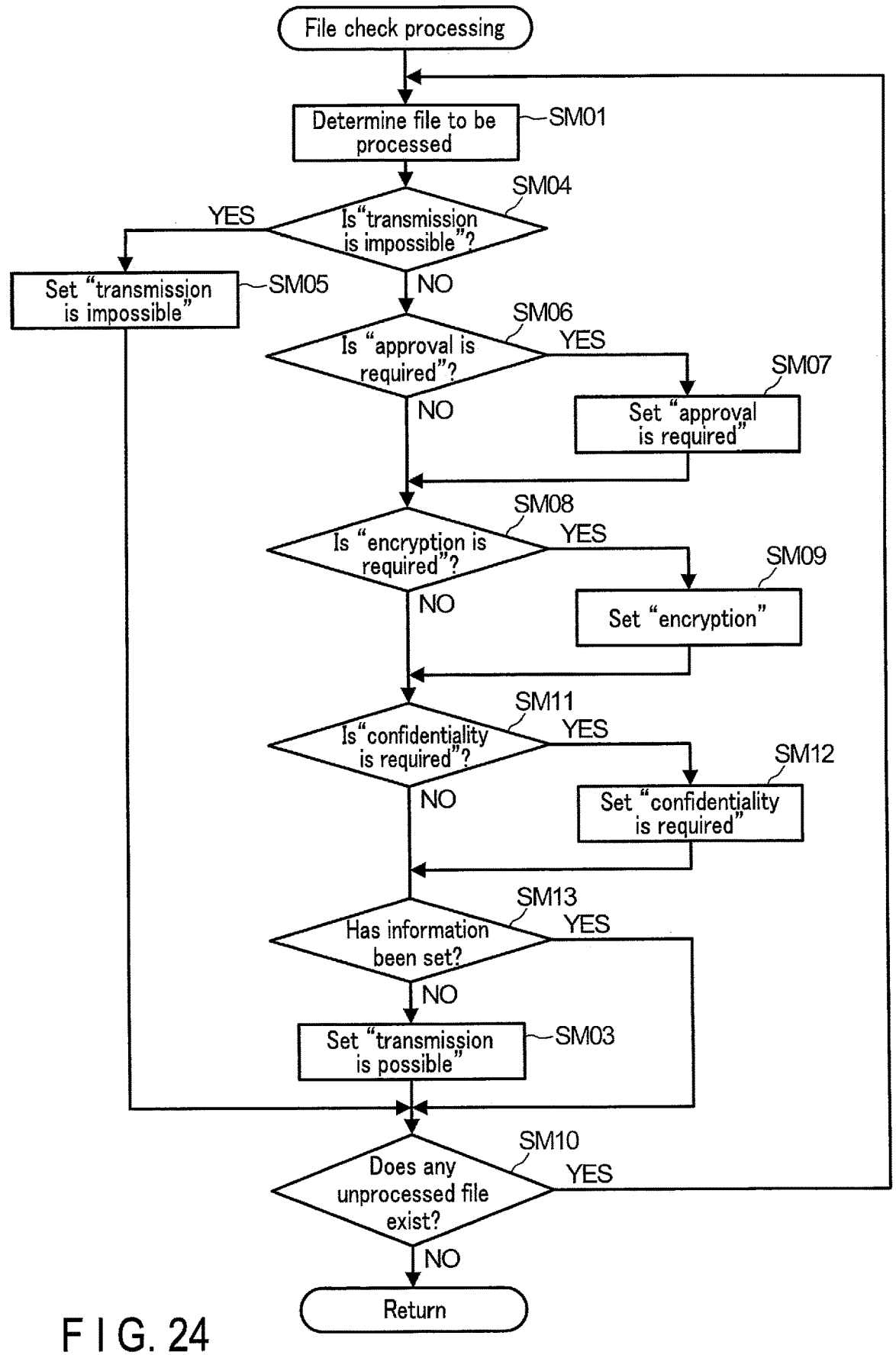
F I G. 24

Name: Part machining drill Unit 1

Model name: Drill Type01

Model number: DR01

Time : 2020/4/20 23:54:10:033

X-axis position: 12.3

X-axis current value: 3.21

Y-axis position: 23.4

Y-axis current value: 4.32

Z-axis position: 34.5

Z-axis current value 5.43

Control program: Part A machining program

Produced number: 100

F I G. 26

| Destination ID | Destination | ... | Confidential level | Rule ID |
|---|---|---|---|---|
| 100001 | Chief XXyama | ... | 1 | — |
| 100002 | Mr./Ms. XX of B Company | ... | 3 | — |
| 100003 | Mr./Ms. △△ | ... | 2 | 0047 |
| ⋮ | ⋮ | ⋮ | ⋮ | ⋮ |

F I G. 27

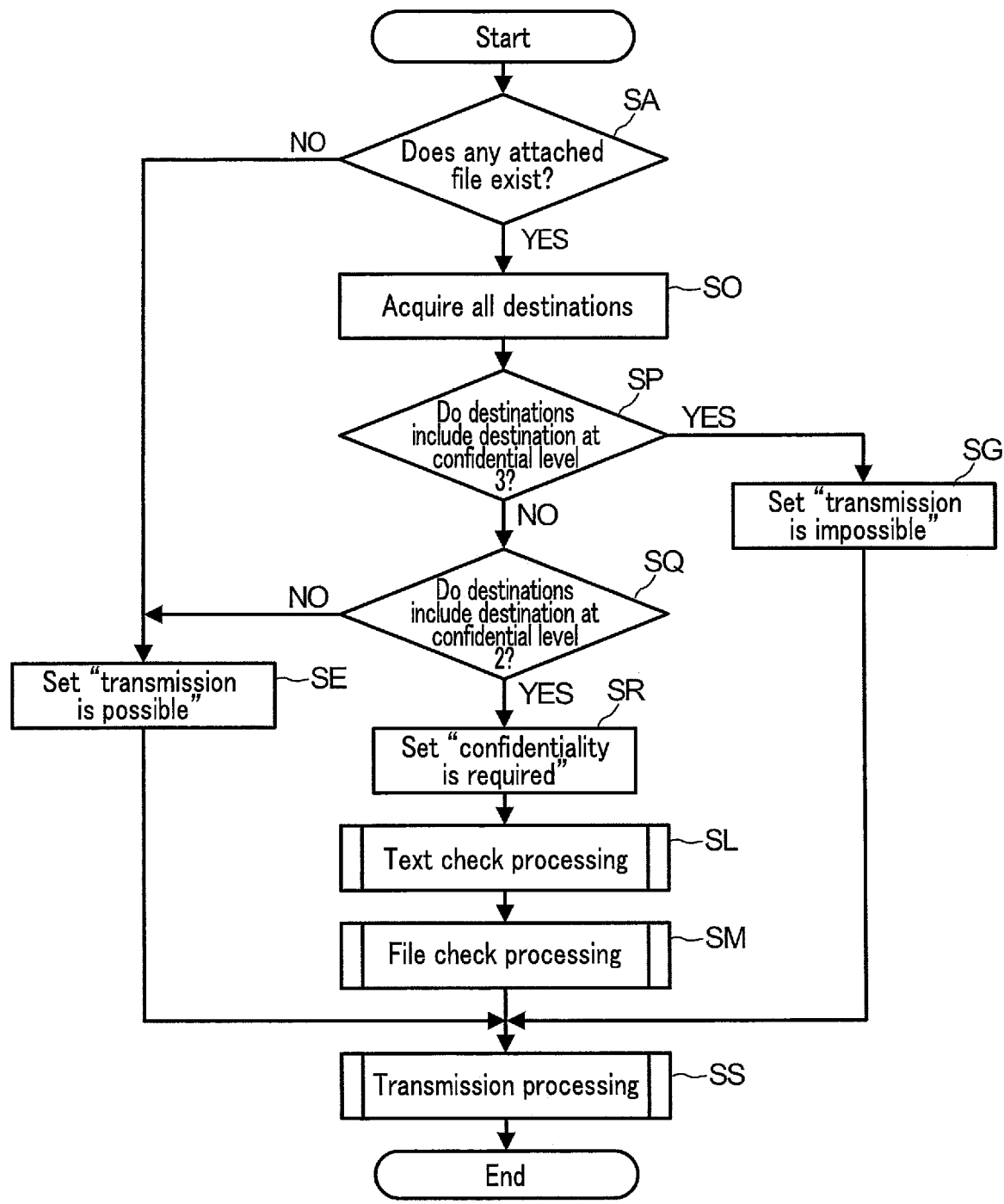
F I G. 28

COMMUNICATION CONTROL APPARATUS, COMMUNICATION CONTROL METHOD, AND NON-TRANSITORY COMPUTER READABLE MEDIUM FOR CONTROLLING TRANSMISSION OF A MESSAGE THAT INCLUDES AN ATTACHED FILE

CROSS-REFERENCE TO RELATED APPLICATION

This application is a Continuation Applications of PCT Application No. PCT/JP2021/028958, filed Aug. 4, 2021 and based upon and claiming the benefit of priority from the prior Japanese Patent Application No. 2020-135100, filed Aug. 7, 2020, the entire contents of all of which are incorporated herein by reference.

FIELD

Embodiments of the invention relate to a communication control apparatus, a communication control method, and a non-transitory computer readable medium storing a communication control program controlling transmission of a message, for example, in transmission of a message including an attached file from an information processing apparatus to one or more destinations via a network.

BACKGROUND

In information processing apparatuses, such as personal computers, exchange of messages using a computer communication tool, such as e-mail and chat, have been widely executed. In such a communication tool, any computer-readable data files can be transmitted and received as attached files, in addition to the message text.

In the meantime, data files generated by companies include files disclosure of which to the outside is prohibited, files disclosure of which is permitted only to specific people, and files that can be disclosed without restriction.

In prior art, it depends on the sender's determination whether to transmit attached files in computer communication tools. For this reason, a data file may be transmitted to a person, even when disclosure of the data file to the person is prohibited.

CITATION LIST

Patent Literature

Patent Literature 1: Japanese Patent Application Publication No. 2018-180837

SUMMARY

According to one aspect of the present invention, a communication control apparatus determines whether a message to be transmitted from an information processing apparatus include at least one attached file, when the message is transmitted from the information processing apparatus to the one or more destinations via a network. When communication control apparatus has determined that the message to be transmitted includes said at least one attached file, the communication control apparatus acquires approval of transmission of said at least one attached file from an approver, and transmits the message including said at least one attached file to said one or more destinations, on condition that approval of transmission of said at least one attached file has been received from the approver.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram illustrating an overall structure of a communication system including a communication control apparatus according to a first embodiment of the present invention.

FIG. 2 is a block diagram illustrating hardware configuration of the communication control apparatus according to the first embodiment.

FIG. 3 is a block diagram illustrating software configuration of the communication control apparatus according to the first embodiment.

FIG. 4 is a diagram illustrating an example of a destination table provided in the communication control apparatus illustrated in FIG. 3.

FIG. 5 is a diagram illustrating a definition example of a confidential level.

FIG. 6 is a diagram illustrating an example of a transmission determination register provided on the communication control apparatus illustrated in FIG. 3.

FIG. 9 is a block diagram illustrating software configuration of a communication control apparatus according to a second embodiment of the present invention.

FIG. 10 is a diagram illustrating an example of a destination table provided on the communication control apparatus illustrated in FIG. 9.

FIG. 11 is a diagram illustrating an example of a text rule table provided on the communication control apparatus illustrated in FIG. 9.

FIG. 12 is a diagram illustrating an example of a file rule table provided on the communication control apparatus illustrated in FIG. 9.

FIG. 13 is a diagram illustrating an example of a transmission determination register provided on the communication control apparatus illustrated in FIG. 9.

FIG. 14 is a diagram illustrating an example of a file determination register provided on the communication control apparatus illustrated in FIG. 9.

FIG. 15 is a diagram illustrating an example of an approval destination register provided on the communication control apparatus illustrated in FIG. 9.

FIG. 17 is a flowchart illustrating a processing procedure of text check processing in the processing procedure illustrated in FIG. 16.

FIG. 20 is a diagram illustrating an example of a data rule table provided on a communication control apparatus according to a third embodiment of the present invention.

FIG. 21 is a diagram illustrating another example of a data rule table provided on the communication control apparatus according to the third embodiment.

FIG. 22 is a diagram illustrating an example of a file determination register provided on the communication control apparatus according to the third embodiment.

FIG. 23 is a diagram illustrating an example of a concealed item register provided on the communication control apparatus according to the third embodiment.

FIG. 24 is a flowchart illustrating a processing procedure of file check processing in the processing procedure of e-mail transmission control executed with the communication control apparatus according to the third embodiment.

FIG. 26 is a diagram illustrating an example of an attached file.

FIG. 27 is a diagram illustrating an example of a destination table provided on a communication control apparatus according to a fourth embodiment of the present invention.

FIG. 28 is a flowchart illustrating a processing procedure of chat message transmission control executed with the communication control apparatus according to the fourth embodiment.

DETAILED DESCRIPTION

First Embodiment

Configuration Example (1) System

Figure 7:
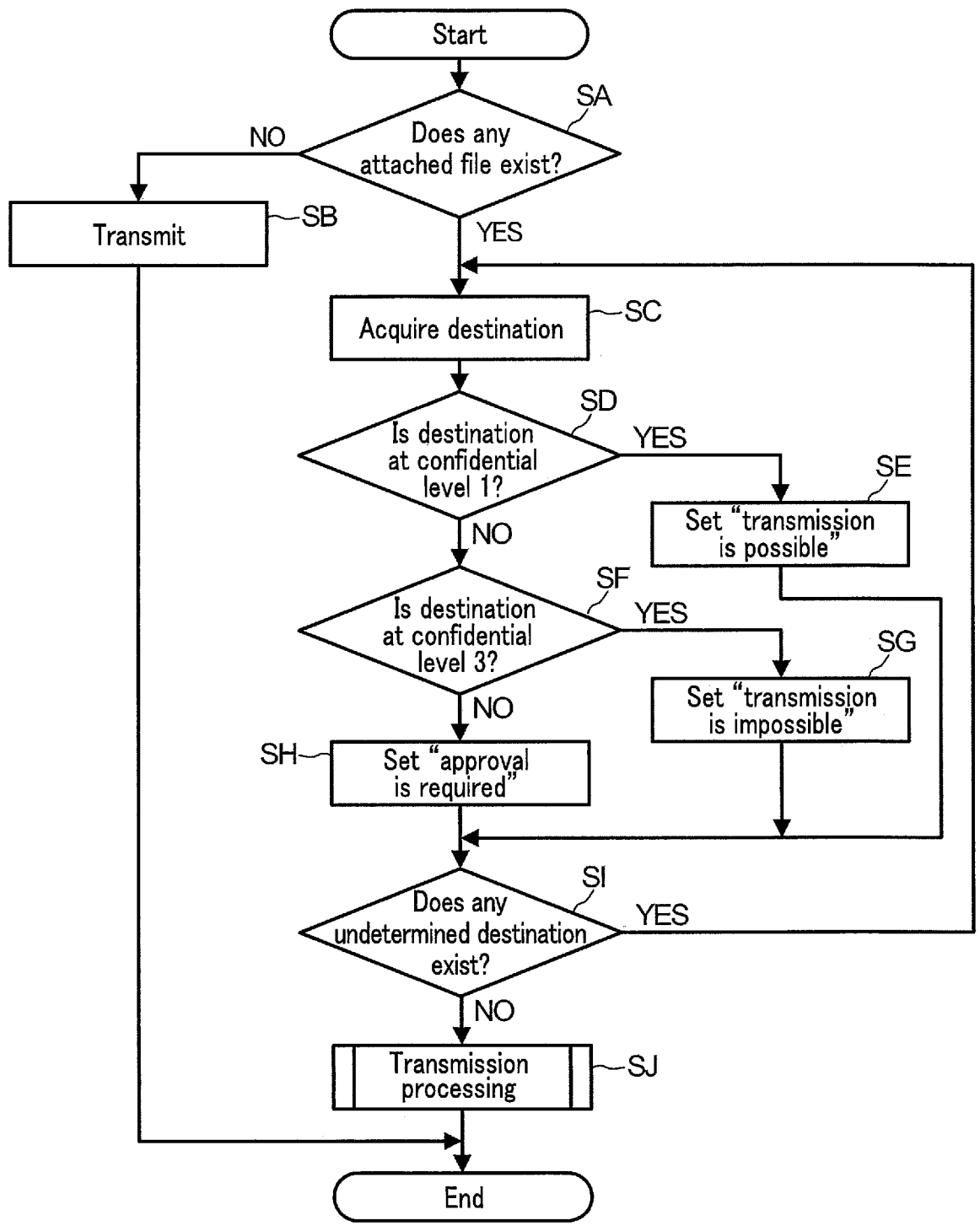
FIG. 7 is a flowchart illustrating a processing procedure of e-mail transmission control executed with the communication control apparatus illustrated in FIG. 3.

FIG. 1 is a diagram illustrating an overall structure of a communication system including a communication control apparatus according to a first embodiment of the present invention.

In FIG. 1, UC denotes a user company to which the user belongs. The user transmits a message including an attached file to the outside by a communication tool executed on, for example, a sender terminal ST. The sender terminal ST is an information processing apparatus, such as a personal computer (hereinafter abbreviated to "PC"). The communication tool is, for example, an e-mail application and/or a chat application executed on the PC.

The user company UC includes, for example, a production line (not illustrated). The production line is provided with a plurality of units of manufacturing equipment RB arranged along a movement direction thereof. The manufacturing equipment RB share and execute work of assembling sets by bending and joining plate-like components carried from another line (not illustrated) or a component supplying apparatus to form a base of each set and attaching a plurality of components to the base stepwise.

Each unit of the manufacturing equipment RB is formed of an assembly robot, and executes predesignated assembling operations under the control of a robot controller RC, such as programmable logic controller (PLC). Each unit of the manufacturing equipment RB is provided with a plurality of sensors (not illustrated) to control and monitor the assembling operations. These sensors output sensor data indicating operation states of respective regions of the manufacturing equipment RB. The sensor data output from the respective sensors are transferred to a file server FS via a premises network (local area network: LAN) NW1 constructed in the user company UC, as a sensor data file in desired unit, and stored therein.

Any form may be adopted as the structure of the production line, the type and the installed number of units of the manufacturing equipment RB, the work details of the manufacturing equipment RB, the structure of products to be manufactured, and the type and the details of the operation states detected by the sensors, and the like. The premises network NW1 is not limited to a wired network, but may be a wireless network.

The premises network NW1 is further connected with a plurality of information processing apparatuses including the sender terminal ST, and a communication controller CT according to the first embodiment of the present invention. The information processing apparatuses includes approver terminals AT used by the approvers who approve transmission of an attached file. Although not illustrated, a plurality of information processing apparatuses used by employees other than the sender exist in the user company UC. Either of the information terminals used by the other employees and the approver terminal AT can serve as the sender terminal ST, when the user thereof is going to send a message including an attached file. Specifically, although FIG. 1 illustrates only one sender terminal ST, there are a plurality of potential sender terminals ST in the user company UC.

Each of the information processing apparatuses can prepare various data files that can be attached files, such as drawing data files, document data files, and sales data files. The prepared data files can be stored in the file server FS via the premises network NW1. The sender can execute a predetermined operation to select, at the sender terminal ST, a desired data file stored in the sender terminal ST or stored in the file server FS, attach the data file to the message text, and transmit it to a desired destination.

The communication controller CT is provided, for example, between the premises network NW1 and a wide area network (WAN) NW2, and can execute data communication with a plurality of destination devices RT via the wide area network NW2. The destination devices RT include an information processing apparatus capable of directly receiving a message including an attached file via the wide area network NW2. Each of the destination devices RT may receive a message via a server device (not illustrated), such as a mail server, retaining a message received via the wide area network NW2 and transmitting the message in response to a request from the destination device RT.

The communication controller CT controls transmission of a message, when an operation to transmit a message to the destination device RT is executed in the sender terminal ST.

(2) Communication Controller CT

FIG. 2 and FIG. 3 are block diagrams illustrating hardware configuration and software configuration, respectively, of the communication controller CT.

The communication controller CT is formed of, for example, a server computer or a PC. The communication controller CT includes a controller 1 including a hardware processor, such as a central processing unit (CPU), and has a structure in which the controller 1 is connected with a program storage 2, a data storage 3, communication interfaces (hereinafter referred to as "communication I/F") 4 and 5, and an input/output interface (hereinafter referred to as "input/output I/F") 6 via a bus 9.

The communication I/F 4 executes data communication with the premises network NW1 in accordance with a communication protocol defined with the premises network NW1, and mainly receives data transmitted from the sender terminal ST to the destination device RT outside the user company UC, under the control of the controller 1. The communication I/F 5 executes data communication with the wide area network NW2 in accordance with a communication protocol defined with the wide area network NW2, and mainly transmits data to the destination device RT, under the control of the controller 1. Although it is not directly related to the present embodiment, the communication I/F 4 can transmit data in the reverse direction and, in the same manner, the communication I/F 5 can receive data in the reverse direction.

The input/output I/F 6 is connected with an input device 7 and a display 8. The input device 7 and the display 8 are used to, for example, input various types of setting information to the communication controller CT by the manager of the communication controller CT and display the setting details.

The program storage 2 is formed of, for example, a nonvolatile memory enabling writing and reading at any time, such as a hard disk drive (HDD) or a solid state drive (SSD), as a main storage medium. The storage area of the program storage 2 stores a program to execute various types of processing according to the first embodiment, in addition to middleware, such as an operating system (OS). The storage medium may be formed of a combination of the HDD or the SSD and a read only memory (ROM).

The data storage 3 is formed of, for example, a combination of an HDD or an SSD and a random access memory (RAM), and includes a storage area provided with a transmission information storage 31, a destination storage 32, and a temporary storage 33 used in the first embodiment.

The transmission information storage 31 is used to store a message output from the sender terminal ST and an attached file, if exists, together with destination address information indicating the destination device RT.

The destination storage 32 stores information of the destination, for example, in the form of a destination table. The destination table is stored by inputting data relating to the destination table from the input device 7 by the manager, prior to start of operation of the communication controller CT. The communication controller CT captures the data input with the input device 7 via the input/output I/F 6, and stores the data in the destination storage 32, under the control of the controller 1. Whenever a new destination occurs, the manager can input data relating to the new destination to additionally register the data to the destination table. In this case, the communication controller CT causes the display 8 to display an additional registration screen via the input/output I/F 6, captures data input to necessary items of the additional registration screen with the input device 7, and stores the data in the destination storage 32, under the control of the controller 1.

FIG. 4 is a diagram illustrating an example of the destination table. According to the first embodiment, in the destination table, various types of information relating to the destination, including the destination information specifying the destination, and a confidential level of each destination are stored, each in association with a destination ID serving as identification information uniquely indicating the destination. The destination information may indicate a group, not an individual of the destination, with a part of a mail address following an @ sign, such as "@Cxxxjp", or may specify an individual, such as "yyyy@Cxxxjp".

The confidential level provides transmission restriction for the attached file. FIG. 5 is a diagram illustrating a definition example of the confidential level. In the first embodiment, the destinations are classified into three levels formed of confidential level 1 to confidential level 3. In this example, no restriction of transmission of attached files exists for the destinations of the confidential level 1, and transmission of attached files is prohibited for the destinations of the confidential level 3. Transmission of an attached file to the destinations of the confidential level 2 is provided with a condition of approval by the approver.

The temporary storage 33 is used to temporarily store various data generated in execution of various types of processing with the controller 1 according to the present embodiment. For example, the temporary storage 33 can store a transmission determination register. FIG. 6 is a diagram illustrating an example of the transmission determination register. The transmission determination register stores information indicating whether transmission of a message including an attached file is permitted (transmission is possible), prohibited (transmission is impossible), or requires approver's approval (approval is required), in association with the destination ID of the destination, for each of one or more destinations of the message to be transmitted. The information can be stored as, for example, a 2-bit flag. For example, the values of the flag can be set such that the value "00" is the initial value of the flag indicating that the state is not settled, the value "10" of the flag indicates "transmission is possible", the value "01" of the flag indicates "transmission is impossible", and the value "11" of the flag indicates "approval is required".

The controller 1 includes a transmission information acquisition section 11, a file existence determination section 12, an approval section 13, a transmission control section 14, and a discrimination section 15, as processing functions relating to the first embodiment of the present invention. Each of the processing sections 11 to 15 is achieved by executing the program stored in the program storage 2 with the hardware processor of the controller 1.

The transmission information acquisition section 11 executes processing of receiving, via the communication I/F 4, a message to be transmitted from the sender terminal ST to one or more destination devices RT via the wide area network NW2, and storing the received message in the transmission information storage 31 in association with the sender terminal ID serving as the identification information specifying the sender terminal ST being the transmission source. Instead of the sender terminal ID, the transmission information acquisition section 11 may use the sender ID serving as identification information uniquely assigned to the sender specified on the basis of the sender information included in the message.

The file existence determination section 12 executes processing of determining whether the message stored in the transmission information storage 31 includes an attached file.

The approval section 13 executes processing of receiving approval of transmission of the attached file from the approver, if the file existence determination section 12 determines that the message to be transmitted and stored in the transmission information storage 31 includes an attached file. Herein, for example, the approver is the sender's superior, and the approver terminal AT of the approver is determined for the sender terminal ID or the sender ID and stored in advance in, for example, the temporary storage 33. Accordingly, the approval section 13 executes processing of transmitting an approval request via the communication I/F 4 to the approver's terminal AT corresponding to the sender terminal ID or the sender ID associated with the message stored in the transmission information storage 31. In this operation, the approval section 13 can extract the sender, the destination, and the file name of the attached file from the message stored in the transmission information storage 31, and include and transmit the pieces of information in the approval request. The approver can determine whether to permit or prohibit transmission of the message on the basis of the pieces of information included in the approval request displayed on the approver terminal AT. The approval section 13 executes processing of receiving an approval result from the approver terminal AT via the communication I/F 4, and storing the approval result in the temporary storage 33.

The transmission control section 14 executes processing of transmitting the message stored in the transmission information storage 31 and including an attached file to the destination device RT serving as the destination, under the condition that approval of transmission of the attached file is acquired from the approver with the approval section 13. If no approval of transmission of the attached file is acquired from the approver with the approval section 13, the transmission control section 14 executes processing of transmitting a transmission impossible notification indicating that transmission of the message including the attached file has not been permitted to the sender terminal ST serving as the transmission source from the communication I/F 5.

If the file existence determination section 12 determines that the message stored in the transmission information storage 31 and to be transmitted includes an attached file, the discrimination section 15 executes processing of extracting the destination from the message, and determining whether the destination is at a confidential level requiring approver's approval of transmission of an attached file, with reference to the destination table stored in the destination storage 32. Accordingly, the approval section 13 can execute processing of acquiring approval from the approver, only in the case of transmitting a message including an attached file to the destination discriminated with the discrimination section 15 as being at a confidential level requiring approver's approval. The transmission control section 14 can transmit a message including an attached file for which approval has been acquired with the approval section 13 from the approver to the destination discriminated with the discrimination section 15 as being at a confidential level requiring approver's approval.

Operation Example

The following is an explanation of an operation example of the communication controller CT configured as described above. Herein, the operation example will be explained with an e-mail, as an example.

(1) Reception of e-Mail Addressed to Outside

When an e-mail addressed to the outside of the user company UC is to be transmitted from the sender terminal ST, the controller 1 of the communication controller CT receives the e-mail transmitted from the sender terminal ST via the communication I/F 4, and stores the e-mail in the transmission information storage 31 of the data storage 3, under the control of the transmission information acquisition section 11. In this operation, the controller 1 stores the received e-mail in the transmission information storage 31 in association with the sender terminal ID specifying the sender terminal ST of the transmission source or the sender ID specifying the sender. The e-mail includes a mail text serving as a message text and information indicating the sender and the destination, and may further include an attached file.

(2) E-Mail Transmission Control

FIG. 7 is a flowchart illustrating a processing procedure of e-mail transmission control executed with the controller 1 of the communication controller CT.

(2-1) Check Existence of Attached File

At Step SA, the controller 1 of the communication controller CT determines whether the e-mail stored in the transmission information storage 31 includes an attached file, under the control of the file existence determination section 12.

(2-2) Control in Absence of Attached File

As a result of determination at Step SA, if no attached file exists, the controller 1 of the communication controller CT transmits, at Step SB, the e-mail stored in the transmission information storage 31 to the destination device RT via the communication I/F 5, under the control of the transmission control section 14. In this operation, the controller 1 may transmit a transmission completion notification indicating that transmission of the e-mail has been completed to the sender terminal ST being the transmission source via the communication I/F 4, under the control of the transmission control section 14. The controller 1 can delete the e-mail stored in the transmission information storage 31. Thereafter, the controller 1 ends the processing of e-mail transmission control.

(2-3) Control in Presence of Attached File (2-3-1) Destination Discrimination

By contrast, as a result of determination at Step SA, if an attached file exists, the controller 1 of the communication controller CT executes processing of discriminating the confidential level of the destination as follows and setting the transmission determination register, under the control of the discrimination section 15.

First, at Step SC, the discrimination section 15 acquires one of destinations of the e-mail stored in the transmission information storage 31. A plurality of destinations may be set for an e-mail, and it is required to discriminate the confidential levels of the destinations individually. For this reason, the discrimination section 15 secures a transmission determination register in the temporary storage 33 for each of the destinations of the e-mail, and extracts one destination for which the value of the transmission determination register has not yet been settled from the destinations, as the destination to be processed.

Thereafter, at Step SD, the discrimination section 15 determines whether the destination serving as the processing target is at confidential level 1, with reference to the destination table stored in the destination storage 32. At this step, supposing that the destination is at the confidential level 1, the destination is a destination provided with no restriction on transmission of an attached file. For this reason, in this case, as a result of determination at Step SD, it is determined that the destination is at the confidential level 1, and the discrimination section 15 sets, at Step SE, information indicating that transmission is possible, for example, a flag value "10", in the transmission determination register of the destination secured in the temporary storage 33.

In addition, as a result of determination at Step SD, if the destination serving as the processing target is not at the confidential level 1, the discrimination section 15 determines, at Step SF, whether the destination serving as the processing target is at the confidential level 3, with further reference to the destination table stored in the destination storage 32. At this step, supposing that the destination is at the confidential level 3, the destination is a destination for which transmission of an e-mail including an attached file is prohibited. For this reason, in this case, as a result of determination at Step SF, it is determined that the destination is at the confidential level 3, and the discrimination section 15 sets, at Step SG, information indicating that transmission is impossible, for example, a flag value "01", in the transmission determination register of the destination secured in the temporary storage 33.

As a result of determination at Step SF, if the destination serving as the processing target is not at the confidential level 3, either, the destination is at the confidential level 2. Specifically, the destination is a destination requiring approver's approval of transmission of an e-mail including an attached file. For this reason, in this case, the discrimination section 15 sets, at Step SH, information indicating that approval is required, for example, a flag value "11", in the transmission determination register of the destination secured in the temporary storage 33.

As described above, when the value indicating "transmission is possible/transmission is impossible/approval is required" is set in the transmission determination register for one destination, the discrimination section 15 determines, at Step SI, whether any unprocessed destination for which no value has been set in the transmission determination register exists in the destinations in the e-mail stored in the transmission information storage 31. If any unprocessed destination exists, the value of the transmission determination register for the unprocessed destination is set by repeating the processing from Step SC described above.

(2-3-2) Transmission Processing

As a result of determination at Step SI, if no unprocessed destination exists, the controller 1 of the communication controller CT executes, at Step SJ, transmission processing of executing transmission of the e-mail stored in the transmission information storage 31 to each of the destinations, under the control of the approval section 13 and the transmission control section 14. Thereafter, after the transmission processing is finished, the controller 1 ends processing of the e-mail transmission control.

Figure 8:
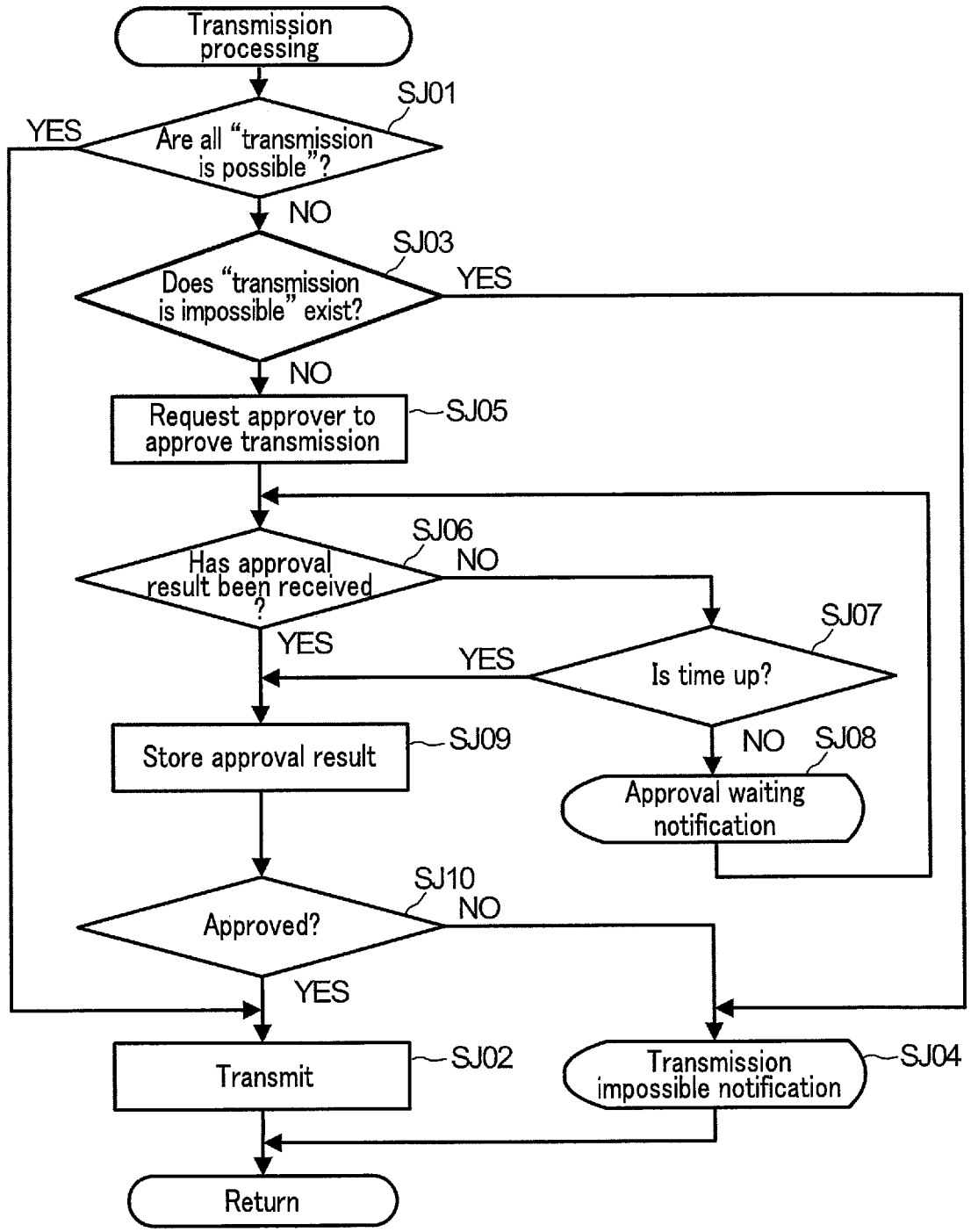
FIG. 8 is a flowchart illustrating a processing procedure of transmission processing in the processing procedure illustrated in FIG. 7.

FIG. 8 is a flowchart illustrating a processing procedure of transmission processing at Step SJ.

The controller 1 of the communication controller CT determines, at Step SJ01, whether all the destinations are destinations of "transmission is possible", under the control of the transmission control section 14. This can be executed by determining whether all the transmission determination registers of the destinations stored in the temporary storage 33 have a value indicating that "transmission is possible", for example, "10".

As a result of determination at Step SJ01, if all the destinations are destinations of "transmission is possible", the controller 1 transmits, at Step SJ02, the e-mail stored in the transmission information storage 31 to the destination devices RT via the communication I/F 5, under the control of the transmission control section 14. In this operation, the controller 1 may transmit a transmission completion notification indicating that transmission of the e-mail has been completed to the sender terminal ST being the transmission source via the communication I/F 4, under the control of the transmission control section 14. The controller 1 can delete the e-mail stored in the transmission information storage 31 and information of the transmission determination registers relating to the e-mail and the like. Thereafter, the controller 1 ends the transmission processing.

By contrast, as a result of determination at Step SJ01, if all the destinations are not destinations transmission to which is possible, the controller 1 determines, at Step SJ03, whether any destination transmission to which is impossible exists, under the control of the transmission control section 14. This can be executed by determining whether the transmission determination registers stored in the temporary storage 33 includes a destination having a set value indicating that transmission is impossible, for example, "01", as the value indicating "transmission is possible/transmission is impossible/approval is required".

As a result of determination at Step SJ03, if a destination of "transmission is impossible" exists, the controller 1 transmits, at Step SJ04, a transmission impossible notification to the sender terminal ST serving as the transmission source via the communication I/F 4, under the control of the transmission control section 14. Thereafter, the controller 1 ends the transmission processing. The sender terminal ST serving as the transmission source can be specified on the basis of the sender terminal ID or the sender ID of the e-mail stored in the transmission information storage 31. The transmission impossible notification may include information indicating the destination by existence of which transmission has been prohibited. The sender terminal ST having received the transmission impossible notification presents, to the sender, information that transmission of the e-mail for which the transmission operation has been executed was not permitted. The controller 1 can delete the e-mail transmission of which has been prohibited and information of the transmission determination register relating to the e-mail and the like from the data storage 3.

As a result of determination at Step SJ03, when no destination of "transmission is impossible" exists, the controller executes processing of acquiring approver's approval of transmission of the attached file as follows, under the control of the approval section 13.

First, at Step SJ05, the approval section 13 requests the approver to approve transmission of the attached file. Specifically, the approval section 13 transmits an approval request via the communication I/F 4 to the approver terminal AT corresponding to the sender terminal ID or the sender ID associated with the e-mail stored in the transmission information storage 31. The approval request can include the sender, the destination, and the file name of each of one or more attached files of the e-mail. The approver can determine whether permit or prohibit transmission of the e-mail on the basis of these pieces of information included in the approval request displayed on the approver terminal AT. If the attached files of the e-mail include any one attached file disclosure of which to the outside is prohibited, the approver sends an approval result of "transmission is impossible" as a response.

At Step SJ06, the approval section 13 determines whether an approval result has been received from the approver terminal AT via the communication I/F 4. As a result of determination at Step SJ06, if no approval result has been received, the approval section 13 determines, at Step SJ07, whether predetermined time as approval waiting time has passed, that is, whether the time is up. As a result of determination at Step SJ07, if the time is not up, the approval section 13 transmits, at Step SJ08, an approval waiting notification indicating that the terminal is waiting for approver's approval of transmission of the e-mail to the sender terminal ST serving as the transmission source via the communication I/F 4. Thereafter, the approval section 13 repeats the above processing from Step SJ06.

As a result of determination at Step SJ06, if an approval result has been received, at Step SJ09, the approval section 13 stores the received approval result in the temporary storage 33. In this case, the approval result is one of "approved" indicating that transmission of the e-mail is permitted and "not approved" indicating that transmission of the e-mail is prohibited.

As a result of determination at Step SJ07, if the time is up, at Step SJ09, the approval section 13 stores an approval result "not approved" indicating that transmission of the e-mail is prohibited in the temporary storage 33.

Thereafter, at Step SJ10, the controller 1 determines whether the approval result stored in the temporary storage 33 is "approved" indicating that transmission of the e-mail is permitted, under the control of the transmission control section 14. As a result of determination at Step SJ10, if the approval result is "approved", the transmission control section 14 proceeds to the processing at Step SJ02 above, and transmits the e-mail stored in the transmission information storage 31 to the destination device RT via the communication I/F 5. As a result of determination at Step SJ10, if the approval result is "not approved" indicating that transmission of the e-mail is prohibited, the transmission control section 14 proceeds to the processing at Step SJ04 above, and transmits a transmission impossible notification to the sender terminal ST serving as the transmission source.

(Operations and Effects)

As described above, the communication controller CT according to the first embodiment of the present invention has a structure in which, when a message such as an e-mail is transmitted from the sender terminal ST serving as the information processing apparatus to one or more destination devices RT via the wide area network NW2, the file existence determination section 12 determines whether the e-mail includes at least one attached file, the approval section 13 acquires approval of transmission of said at least one attached file from the approver if the file existence determination section 12 has determined that the e-mail to be transmitted includes said at least one attached file, and the transmission control section 14 transmits the e-mail including said at least one attached file to one or more destination devices RT, on condition that the approval section 13 has received approval of transmission of said at least one attached file from the approver. As described above, if an attached file exists in an e-mail, the communication controller CT according to the first embodiment is configured to have the approver verify whether the attached file can be transmitted, and transmit the e-mail after acquiring approval from the approver. This structure reduces possibility of inappropriate transmission of a file with disclosure restriction.

The communication controller CT according to the first embodiment has a structure in which the destination storage 32 serving as a level storage stores confidential levels indicating disclosure levels for confidential information for predetermined destinations, the discrimination section 15 discriminates each of the destinations of the e-mail as to whether the destination is at a confidential level requiring approver's approval when an attached file is transmitted, on the basis of the confidential levels stored in the destination storage 32, if the file existence determination section 12 has determined that the e-mail to be transmitted includes an attached file, and, if any destination discriminated with the discrimination section 15 as being at a confidential level requiring approval exists, the transmission control section 14 transmits the e-mail including the attached file in a case where the approval section 13 has acquired approval from the approver. As described above, the communication controller CT discriminates the confidential levels of the destinations of the e-mail, and acquires approval from the approver if the destinations include any one destination requiring approver's approval. This structure reduces possibility of inappropriate transmission of a file with disclosure restriction to a destination to which disclosure of the file is not permitted. In addition, if the destinations include no destination requiring approver's approval, no approver's approval is required. This structure enables immediate transmission of the e-mail without waiting for approver's approval, and removes the necessity for approval work of the approver.

According to the first embodiment, if an e-mail includes a plurality of attached files, approval is not acquired for each of the attached files separately. For this reason, if transmission is impossible for any one of said at least one attached file of the e-mail, an approval result "not approved" is transmitted from the approver as a response. As described above, if the approval section 13 has acquired no approval of transmission from the approver for any one of said at least one attached file, the transmission control section 14 does not transmit the message including said at least one attached file. Specifically, in the case where any one attached file transmission of which is not approved exists, the e-mail is not transmitted to any destinations. This structure reduces the possibility of erroneous transmission of a file with disclosure restriction.

Second Embodiment

The communication controller CT according to the first embodiment inquires of the approver whether transmission of an attached file is possible, if any attached file exists. By contrast, a communication controller CT according to a second embodiment is configured to determine whether the attached file is a confidential file with disclosure restriction and, if the attached file is a confidential file, inquires of the approver whether transmission of the attached file is possible.

Configuration Example

FIG. 9 is a block diagram illustrating software configuration of the communication controller CT according to the second embodiment of the present invention. The hardware configuration of the communication controller CT according to the second embodiment is similar to that of the first embodiment.

The storage area of the data storage 3 is provided with a transmission information storage 31, a destination storage 32, a temporary storage 33, and a rule storage 34 used in the second embodiment.

The transmission information storage 31 is similar to that of the first embodiment.

The destination storage 32 stores information of destinations in the form of, for example, a destination table. FIG. 10 is a diagram illustrating an example of the destination table. In comparison with the destination table in the first embodiment, the destination table according to the second embodiment further registers a rule ID serving as identification information to specify the transmission rule in association with the destination ID. For example, a rule ID "47" is registered for the destination with the destination ID "000003". In FIG. 10, one rule ID is registered for one destination ID, but a plurality of rule IDs may be registered for one destination ID.

The rule storage 34 stores, for each of rule IDs, a rule table storing transmission rules indicating whether approval of the approver is required for transmission of an attached file. The rule table is stored by inputting data relating to the rule table from the input device 7 by the manager, prior to start of the operation of the communication controller CT. The communication controller CT captures the data input with the input device 7 via the input/output I/F 6, and stores the data in the rule storage 34, under the control of the controller 1. Whenever a new rule is required, the manager can additionally register the new rule in the rule table by inputting data relating to the new rule from the input device 7. In this case, the communication controller CT displays an additional registration screen on the display 8 via the input/output I/F 6, captures data input with the input device 7 to the required items of the additional registration screen via the input/output I/F 6, and stores the data in the rule storage 34, under the control of the controller 1.

Two types of rule tables exist as the rule table. The two types are a text rule table relating to the message text of the message, and a file rule table relating to attached files.

FIG. 11 is a diagram illustrating an example of the text rule table. The text rule table provides items "approval is required", "encryption is required", and "transmission is impossible", in association with confidential words that would appear in the message text, in the second embodiment.

Words with which existence of a confidential file with disclosure restriction is estimated are set as the confidential words.

The item "approval is required" describes the approver whose approval is required if approval of the approver is required, in the case where the confidential word exists in the message text. Specifically, with respect to some files, it is assumed that the sender's superior alone cannot determine whether to approve transmission of the files. For this reason, in the present embodiment, transmission of a file can be approved by a plurality of approvers.

The item "encryption is required" and "transmission is impossible" provide the confidential processing method for the attached file. The item "encryption is required" shows a value indicating encryption is required, if encryption is required when a message is transmitted, in the case where the confidential word exists in the message text. The item "transmission is impossible" shows a value indicating that transmission of an attached file is prohibited, that is, transmission of the message is impossible, if the confidential word exists in the message text.

FIG. 11 illustrates an example of the text rule table of the rule ID "47". For example, for the confidential word "sales data", the text rule table shows that approver's approval is required, shows "preparer's superior, approver of the preparation department of the attached file, and the like" as the approvers, and shows a value indicating that encryption is required. The text rule table also shows a value indicating that transmission of a message including an attached file is impossible for the confidential word "company secret".

FIG. 12 is a diagram illustrating an example of the file rule table. In the second embodiment, the file rule table provides the items "approval is required", "encryption is required", and "transmission is impossible", in the same manner as the text rule table, in association with confidential properties with which the file may be a confidential file with disclosure restriction.

The confidential properties are values that can be specified from file property information and enabling specification of the contents of the file to some extent without determining the contents of the data file included in the message. For example, the confidential profile can include a value specifying the extension of the file, a character string included in the file name, a character string indicating the preparer of the file, and/or a value providing the preparation date and time of the file, and the like. While the text rule table provides the items "approval is required", "encryption is required", or "transmission is impossible" for all of at least one attached file of the message together, the file rule table provides the items "approval is required", "encryption is required", or "transmission is impossible" for each of at least one attached file.

FIG. 12 illustrates an example of the file rule table of the rule ID "47". For example, for the extension "pdf" serving as a confidential property of a confidential file, the file rule table shows that approver's approval is required, shows "preparer's superior, approver of the preparation department of the attached file, and the like" as the approvers, and shows a value indicating that encryption is required. In addition, for the file name "contract" and the preparer "DR01" serving as confidential properties of the confidential file, the file rule table shows that approver's approval is required, shows "preparer's superior, approver of the legal department, and the like" as the approvers, and shows a value indicating that encryption is required. These rules are applied with respect to the file name and the preparer, if the corresponding character string is included in part of the character string specifying the file name of the attached file or preparer of the attached file. The file rule table also shows that transmission of a message including an attached file is impossible, for the preparation date and time "within 24 hours" serving as a confidential property.

The temporary storage 33 is used to temporarily store various data generated during various types of processing executed with the controller 1 according to the second embodiment. For example, the temporary storage 33 can store a transmission determination register, a file determination register, an approval destination register, and the like.

FIG. 13 is a diagram illustrating an example of the transmission determination register. As described in the first embodiment, the transmission determination register stores information indicating whether transmission of a message including an attached file is permitted (transmission is possible), prohibited (transmission is impossible), or requires approver's approval (approval is required), in association with the destination ID of the destination, for each of one or more destinations of the message to be transmitted. In the present embodiment, the transmission determination register further stores a rule ID registered for the destination in the destination table stored in the destination storage 32.

FIG. 14 is a diagram illustrating an example of the file determination register for each of attached files. The file determination register stores, in association with the file ID to distinguish each of the attached files, such as a file name, information indicating "transmission is possible/transmission is impossible/approval is required", in the same manner as the transmission determination register, information indicating whether encryption is required, and information indicating "approved" or "not approved" serving as an approver's approval result. These types of information can be stores as, for example, a 4-bit flag. A 2-bit flag in the 4 bits can indicate whether transmission of the attached file is permitted, prohibited, or requires approver's approval. For example, in the same manner as the transmission determination register, the values of the flag can be set such that the value "00" is the initial value of the flag indicating that the state is not settled, the value "10" of the flag indicates "transmission is possible", the value "01" of the flag indicates "transmission is impossible", and the value "11" of the flag indicates "approval is required". In addition, a 1-bit flag indicates whether encryption is required for transmission of the attached file. For example, the flag value "0" indicating that encryption is not required is set as an initial value, and the value "1" of the flag can be set to indicate that "encryption is required". The remaining 1-bit flag indicates whether the attached file has been approved by the approver. For example, the flag value "0" indicating the approval result indicating "not approved" is set as an initial value, and the approval result can indicate "approved" with the flag value "1".

FIG. 15 is a diagram illustrating an example of the approval destination register. The approval destination register is provided for each of approvers or each of approver terminals AT. Specifically, the approval destination register stores the destination ID and the item "approved/not approved" in association with the file ID, for each of the approval destination ID indicating the approver or the approver terminal AT. The item "approved/not approved" indicates an approval result of the corresponding attached file by the approver. For example, the value "0" indicating the approval result indicating "not approved" is set as an initial value, and the value "1" is stored when approval is acquired.

The controller 1 includes a transmission information acquisition section 11, a file existence determination section 12, an approval section 13, a transmission control section 14, a discrimination section 15, a transmission decision section 16, and a confidentiality section 17, as processing functions according to the second embodiment of the present invention. Each of these processing sections 11 to 17 are achieved by executing a program stored in the program storage 2 with a hardware processor of the controller 1.

The transmission information acquisition section 11, the file existence determination section 12, and the discrimination section 15 are the same as those of the first embodiment.

The transmission decision section 16 executes processing of deciding whether approver's approval is required, on the basis of the transmission rule stored in the rule storage 34, for at least one attached file to be transmitted to the destination discriminated with the discrimination section 15 as being at a confidential level requiring approval. For example, the transmission decision section 16 decides whether the confidential word in the text rule table stored in the rule storage 34 is included in the message to be transmitted to the destination and, if any of the confidential words is included in the message, can decide that all the attached files to be transmitted to the destination require approver's approval. In addition, for example, the transmission decision section 16 decides whether each of at least one attached file to be transmitted to the destination matches with any of confidential properties of the confidential file in the file rule table stored in the rule storage 34, and can determine that the file requires approver's approval if the attached file matches with the confidential property. The transmission decision section 16 also executes processing of specifying the approver from which approval should be acquired, on the basis of specification information to specify the approver who should execute approval, if it decides that approver's approval is required. The specification information is included in the transmission rule stored in the rule storage 34.

The transmission decision section 16 also executes processing of deciding whether confidentiality is required for the attached file, on the basis of the transmission rule stored in the rule storage 34, for at least one attached file to be transmitted to the destination. For example, if the confidential word in the text rule table stored in the rule storage 34 is included in the message to be transmitted to the destination, the transmission decision section 16 decides whether a confidentiality processing method of "encryption is required" or "transmission is impossible" is set for the confidential word. If "encryption is required" is set as the confidentiality processing method, the transmission decision section 16 can decide that encryption is required for all the attached files to be transmitted to the destination. If "transmission is impossible" is set as the confidentiality processing method, the transmission decision section 16 can decide that transmission of a message including an attached file is prohibited. In addition, for example, if each of at least one attached file to be transmitted to the destination matches with any of confidential properties of the confidential file in the file rule table stored in the rule storage 34, the transmission decision section 16 decides whether the confidentiality processing method of "encryption is required" or "transmission is impossible" is set for the confidential file. If "encryption is required" is set as the confidentiality processing method, the transmission decision section 16 can decide that encryption is required for the confidential file. If "transmission is impossible" is set as the confidentiality processing method, the transmission decision section 16 can decide that transmission of the confidential file is prohibited.

The approval section 13 executes processing of acquiring approval from the approver specified with the transmission decision section 16, in the case where message including an attached file decided with the transmission decision section 16 as a file requiring approver's approval.

The confidentiality section 17 executes confidentiality processing based on the confidentiality processing method included in the transmission rule stored in the rule storage 34, for the attached file decided with the transmission decision section 16 as a file requiring approver's approval. For example, if "encryption of the attached file" is set as the confidentiality processing method, the confidentiality section 17 encrypts the attached file. The encryption method is not specified in the present embodiment. For example, the confidentiality section 17 can convert the attached file into a compressed file with a password. If "transmission is impossible" is set as the confidentiality processing method, for example, the confidentiality section 17 prohibits transmission of the attached file or the message.

The transmission control section 14 executes processing of transmitting a message including the attached file having been subjected to confidentiality processing with the confidentiality section 17 as necessary. In the transmission, with respect to a message including the attached file decided with the transmission decision section 16 as a file requiring approver's approval, the transmission control section 14 executes processing of transmitting the message under the condition that the approval section 13 has acquired approval from the approver.

Operation Example

The following is an explanation of an operation example of the communication controller CT configured as described above. Herein, the operation example will be explained with an e-mail as an example.

(1) Reception of e-Mail Addressed to Outside

As described in the first embodiment, when an e-mail addressed to the outside of the user company UC is going to be transmitted from the sender terminal ST, the controller 1 of the communication controller CT receives the e-mail transmitted from the sender terminal ST via the communication I/F 4, and stores the e-mail in the transmission information storage 31 of the data storage 3, under the control of the transmission information acquisition section 11.

(2) E-Mail Transmission Control

Figure 16:
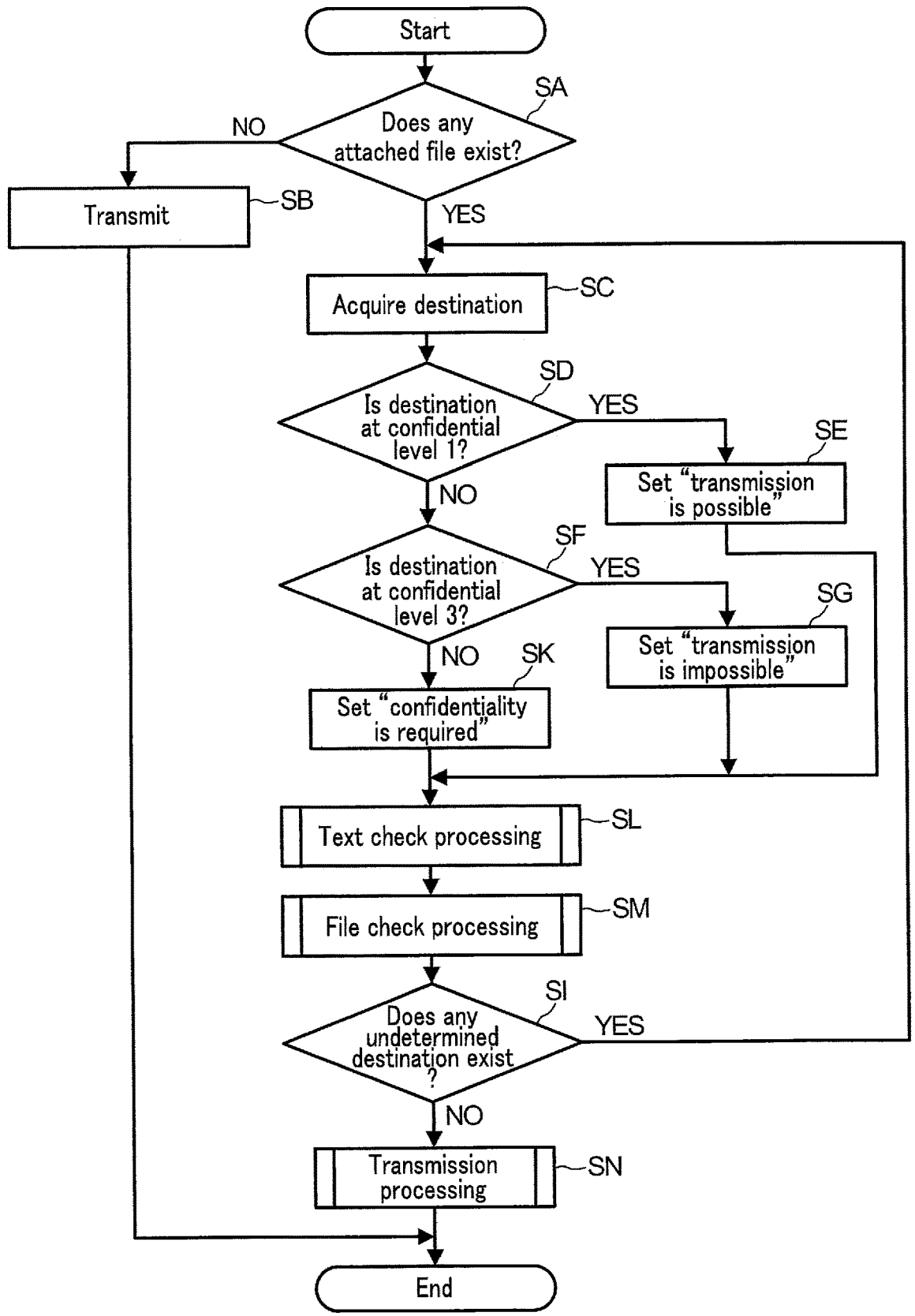
FIG. 16 is a flowchart illustrating a processing procedure of e-mail transmission control executed with the communication control apparatus illustrated in FIG. 9.

FIG. 16 is a flowchart illustrating a processing procedure of e-mail transmission control executed with the controller 1 of the communication controller CT.

(2-1) Check Existence of Attached File

As described in the first embodiment, at Step SA, the controller 1 of the communication controller CT determines whether the e-mail stored in the transmission information storage 31 includes an attached file, under the control of the file existence determination section 12.

(2-2) Control in Absence of Attached File

As described in the first embodiment, as a result of determination at Step SA, if no attached file exists, the controller 1 of the communication controller CT transmits, at Step SB, the e-mail stored in the transmission information storage 31 to the destination device RT via the communication I/F 5, under the control of the transmission control section 14.

(2-3) Control in Presence of Attached File

As described in the first embodiment, as a result of determination at Step SA, if an attached file exists, the controller 1 of the communication controller CT executes processing of discriminating the confidential level of the destination as follows and setting the transmission determination register, the file determination register, and the approval destination register, under the control of the discrimination section 15 and the transmission decision section 16.

First, at Step SC, the discrimination section 15 acquires one of destinations of the e-mail stored in the transmission information storage 31, as described in the first embodiment.

(2-3-1) Destination Discrimination

Thereafter, as described in the first embodiment, if the discrimination section 15 determines at Step SD that the destination serving as the processing target is at confidential level 1 with reference to the destination table stored in the destination storage 32, the discrimination section 15 sets, at Step SE, information indicating that transmission is possible, for example, a flag value "10", in the transmission determination register of the destination secured in the temporary storage 33. In addition, if the discrimination section 15 determines at Step SF that the destination serving as the processing target is at the confidential level 3, the discrimination section 15 sets, at Step SG, information indicating that transmission is impossible, for example, a flag value "01", in the transmission determination register of the destination secured in the temporary storage 33.

By contrast, as a result of determination at Step SF, if the destination serving as the processing target is not at the confidential level 3, either, that is, the destination is at the confidential level 2, the discrimination section 15 sets, at Step SK, "confidentiality is required" in the transmission determination register of the destination secured in the temporary storage 33. In the processing of setting "confidentiality is required", the discrimination section 15 sets information indicating approval is required, for example, a flag value "11", in the information "transmission is possible/transmission is impossible/approval is required", and transcribes the rule ID registered for the destination and stored in the destination table stored in the destination storage 32 in the transmission determination register.

(2-3-2) File Discrimination

As described above, when a value indicating "transmission is possible/transmission is impossible/approval is required" is set in the transmission determination register for one destination, at Step SL, the controller 1 executes text check processing under the control of the transmission decision section 16. The text check processing is processing of discriminating whether approval of the attached file by the approver is required, on the basis of the mail text of the e-mail, and setting the file determination register and the approval destination register. The details of the text check processing will be described later.

Thereafter, at Step SM, the controller 1 executes file check processing under the control of the transmission decision section 16. The file check processing is processing of discriminating whether approval of the attached file by the approver is required, on the basis of the property information of the attached file of the e-mail, and setting the file determination register and the approval destination register. The details of the text check processing will be described later.

In the present embodiment, both the text check processing and the file check processing are executed, but only one of them may be executed.

As described, when determination is finished as to whether approval of the attached file by the approver is required, at Step SI, the discrimination section 15 determines whether any unprocessed destination for which no value has been set in the transmission determination register exists in the destinations in the e-mail stored in the transmission information storage 31, as described in the first embodiment. If any unprocessed destination exists, the value of the transmission determination register for the unprocessed destination is set by repeating the processing from Step SC described above.

(2-3-3) Transmission Processing

As a result of determination at Step SI, if no unprocessed destination exists, the controller 1 of the communication controller CT executes, at Step SN, transmission processing of executing transmission of the e-mail stored in the transmission information storage 31 to each of the destinations of the e-mail stored in the transmission information storage 31, under the control of the approval section 13 and the transmission control section 14. The details of the transmission processing will be described later. Thereafter, after the transmission processing is finished, the controller 1 ends processing of the e-mail transmission control.

(2-3-4) Details of Text Check Processing

FIG. 17 is a flowchart illustrating a processing procedure of text check processing executed with the controller 1 at Step SL under the control of the transmission decision section 16.

First, at Step SL01, the transmission decision section 16 reads the mail text of the e-mail stored in the transmission information storage 31. In this operation, the transmission decision section 16 also secures a file determination register in the temporary storage 33 for each of at least one attached file of the e-mail.

Thereafter, at Step SL02, the transmission decision section 16 decides whether the e-mail text includes any confidential word, with reference to the text rule table of the rule storage 34 specified with the rule ID of the transmission determination register stored in the temporary storage 33.

As a result of decision at Step SL02, if the e-mail text includes no confidential word, the transmission decision section 16 sets, at Step SL03, a value indicating that transmission is possible, for example, the value "10", for each of the file determination registers stored in the temporary storage 33. Thereafter, the transmission decision section 16 ends the text check processing.

By contrast, as a result of decision at Step SL02, if the e-mail text includes any confidential word, the transmission decision section 16 decides, at Step SL04, whether "transmission is impossible" is set as the confidentiality processing method for the confidential word of the text rule table. The e-mail text may include a plurality of confidential words. In this example, the transmission decision section 16 decides whether "transmission is impossible" is set as the confidentiality processing method for any of the confidential words.

As a result of decision at Step SL04, if "transmission is impossible" is set as the confidentiality processing method for any of the confidential words, the transmission decision section 16 sets, at Step SL05, a value indicating that transmission is impossible, for example, the value "01", for each of the file determination registers stored in the temporary storage 33. Thereafter, the transmission decision section 16 ends the text check processing.

By contrast, as a result of decision at Step SL04, if "transmission is impossible" is not set for any of the confidential words, the transmission decision section 16 decides, at Step SL06, whether "approval is required" is provided for the confidential word of the text rule table.

As a result of decision at Step SL06, if "approval is required" is provided for any confidential word, the transmission decision section 16 sets, at Step SL07, a value indicating that approval is required, for example, the value "11", for each of the file determination registers stored in the temporary storage 33. In addition, the transmission decision section 16 secures an approval destination register for each of the approvers provided for the confidential word of the text rule table in the temporary storage 33.

As a result of decision at Step SL06, if "approval is required" is not provided for any confidential words, or after the processing at Step SL07, the transmission decision section 16 decides, at Step SL08, whether "encryption is required" is provided as the confidentiality processing method for the confidential word of the text rule table.

As a result of determination at Step SL08, if "encryption is required" is not provided for any confidential words, the transmission decision section 16 ends the text check processing.

By contrast, as a result of decision at Step SL08, if "encryption is required" is provided for any confidential word, the transmission decision section 16 stores, at Step SL09, the setting "encryption is required", as encryption setting, for each of the file determination registers stored in the temporary storage 33. Thereafter, the transmission decision section 16 ends the text check processing.

(2-3-5) Details of File Check Processing

Figure 18:
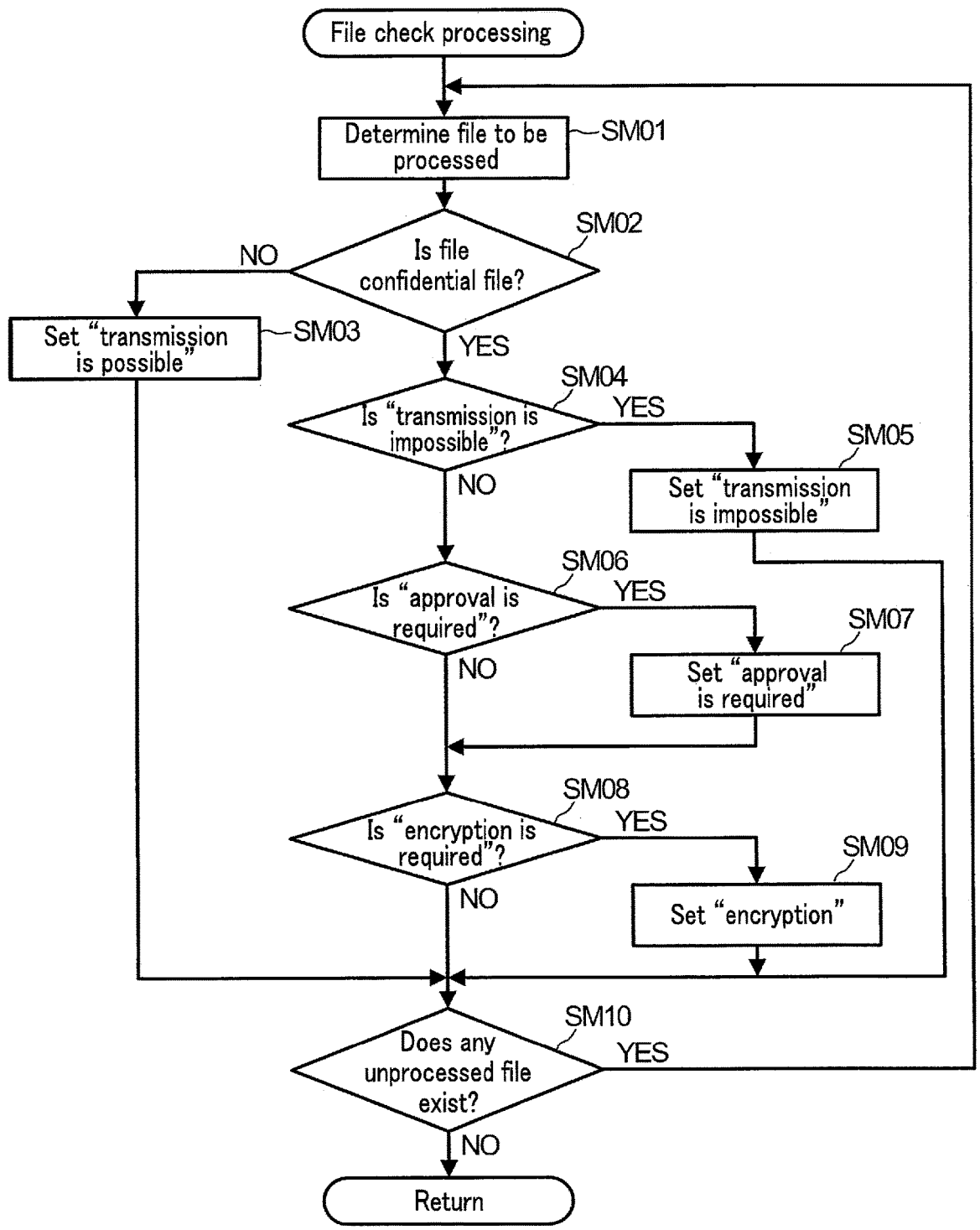
FIG. 18 is a flowchart illustrating a processing procedure of file check processing in the processing procedure illustrated in FIG. 16.

FIG. 18 is a flowchart illustrating a processing procedure of file check processing executed at Step SM with the controller 1 under the control of the transmission decision section 16.

First, at Step SM01, the transmission decision section 16 decides one of attached files of the e-mail stored in the transmission information storage 31, as the processed file. Because a plurality of files can be attached to the e-mail, the attached files should be processed individually. For this reason, the transmission decision section 16 secures a file determination register in the temporary storage 33 for each of at least one attached file of the e-mail, and determines one attached file that has not yet been determined as to whether the file is a confidential file from the attached files, as the processed file.

Thereafter, at Step SM02, the transmission decision section 16 decides whether the processed file is a confidential file, with reference to the file rule table of the rule storage 34 that is specified with the rule ID of the transmission determination register stored in the temporary storage 33. This can be decided on the basis of whether the property information of the processed file matches with any of confidential properties of the confidential files provided in the file rule table.

As a result of determination at Step SM02, if the processed file is not a confidential file, the transmission decision section 16 sets, at Step SM03, a value indicating that transmission is possible, for example, the value "10", in the file determination register of the processed file stored in the temporary storage 33.

By contrast, as a result of determination at Step SM02, if the processed file is a confidential file, the transmission decision section 16 decides, at Step SM04, whether "transmission is impossible" is provided as the confidentiality processing method for the confidential property of the file rule table. The processed file may match with a plurality of confidential properties. Herein, the transmission decision section 16 decides whether "transmission is impossible" is set as the confidentiality processing method for one of the confidential properties.

As a result of determination at Step SM04, if "transmission is impossible" is provided for any confidential property, the transmission decision section 16 sets, at Step SM05, a value indicating that transmission is impossible, for example, the value "01", in the file determination register of the processed file stored in the By contrast, as a result of determination at Step SM04, if "transmission is impossible" is not provided for any confidential property, the transmission decision section 16 decides, at Step SM06, whether "approval is required" is provided for the confidential property of the file rule table.

As a result of determination at Step SM06, if "approval is required" is provided for any confidential property, the transmission decision section 16 sets, at Step SM07, a value indicating that approval is required, for example, the value "11", in the file determination register of the processed file stored in the temporary storage 33. In addition, the transmission decision section 16 secures an approval destination register for each of approvers provided for the confidential property of the file rule table in the temporary storage 33.

As a result of determination at Step SM06, if "approval is required" is not provided for any confidential property, or after the processing at Step SM07, the transmission decision section 16 decides, at Step SM08, whether "encryption is required" is provided as the confidentiality processing method for the confidential profile of the file rule table.

As a result of determination at Step SM08, if "encryption is required" is provided for any confidential property, the transmission decision section 16 stores, at Step SM09, "encryption is required" as encryption setting in the file determination register of the processed file stored in the temporary stored 33.

As a result of determination at Step SM08, if "encryption is required" is not provided for any confidential property, or if setting for the processed file is executed in the file determination register at Step SM03, Step SM05, or Step SM09, the transmission decision section 16 decides, at Step SM10, whether any unprocessed file that has not yet been decided as to whether the file is a confidential file exists in the file determination registers stored in the temporary storage 33. If any unprocessed file exists, the transmission decision section 16 repeats the above processing from Step SM01 to set the value of the file determination register for the unprocessed file.

As a result of decision at Step SM10, if no unprocessed file exists, the transmission decision section 16 ends the file check processing.

(2-3-6) Details of Transmission Processing

Figure 19:
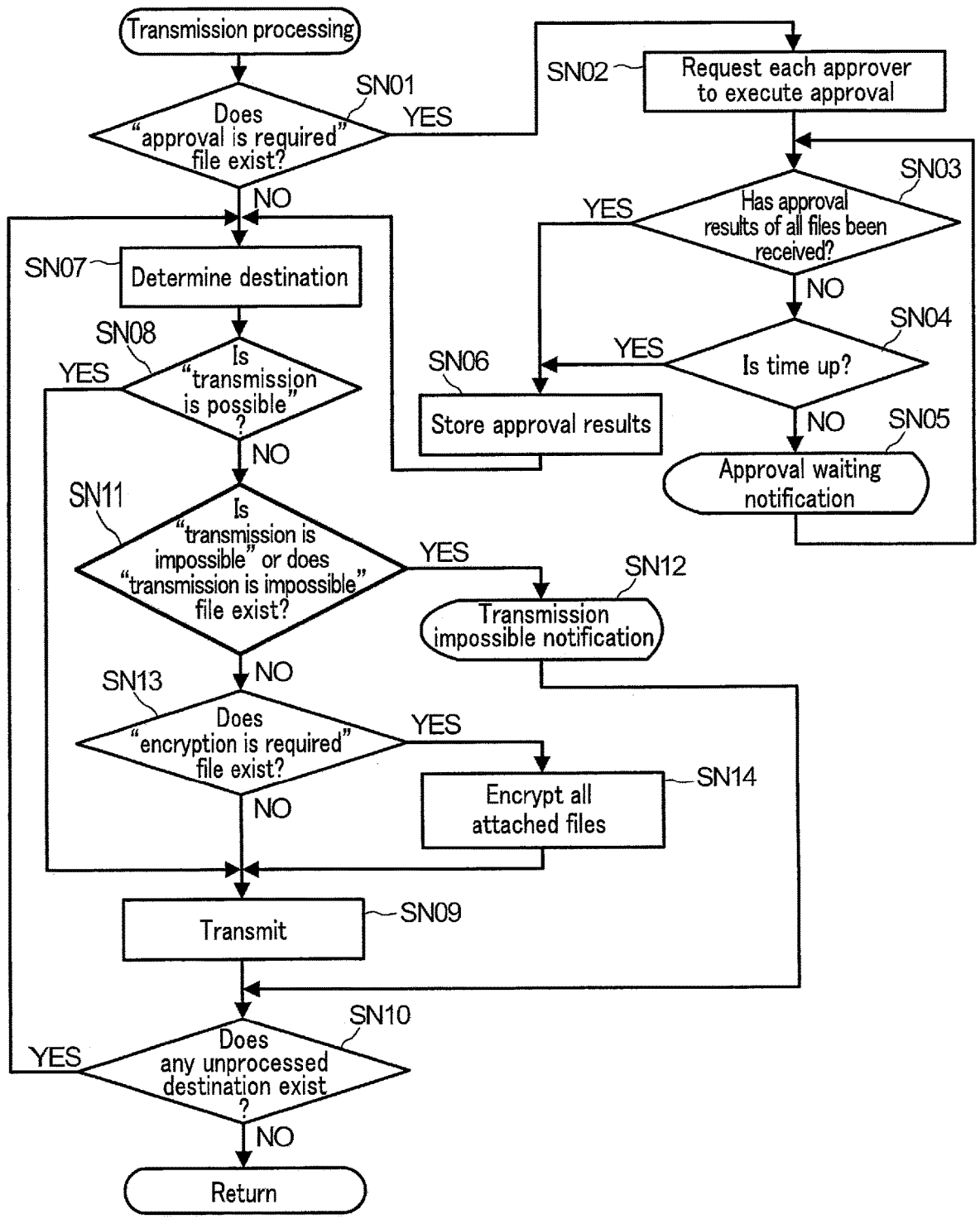
FIG. 19 is a flowchart illustrating a processing procedure of transmission processing in the processing procedure illustrated in FIG. 16.

FIG. 19 is a flowchart illustrating a processing procedure of transmission processing executed at Step SN with the controller 1 under the control of the approval section 13 and the transmission control section 14.

At Step SN01, the controller 1 of the communication controller CT determines whether any file requiring approval exists, with reference to file determination registers for the respective attached files stored in the temporary storage 33, under the control of the approval section 13.

As a result of determination at Step SN01, if any file requiring approval exists, the controller 1 executes processing of acquiring approver's approval of transmission of the attached file as follows, under the control of the approval section 13.

First, at Step SN02, the approval section 13 requests each approver to approve transmission of the attached file. Specifically, the approval section 13 transmits an approval request to the approver terminal AT corresponding to the approval destination ID of each approval destination register stored in the temporary storage 33, via the communication I/F 4. The approval request can include the sender and the destinations of the e-mail, and file names of the attached files to be transmitted. In this case, the destinations and the attached files may be different between the approvers. Each of the approvers can determine whether to permit or prohibit transmission of each of the attached files on the basis of these pieces of information included in the approval request displayed on the approver terminal AT. The approver individually executes determination for the attached files, and sends approval results as responses. When the approval section 13 receives approval results from the approver terminals AT via the communication I/F 4, the approval section 13 reflects the authentication results for each of the files on the values of the item "approved/not approved" of the approval destination registers.

At Step SN03, the approval section 13 determines whether approval results of all the attached files requiring attachment have been received from all the approver terminals AT. As a result of determination at Step SN03, if approval results of all the attached files have not yet been received, the approval section 13 determines, at Step SN04, whether predetermined time as approval waiting time has passed, that is, whether the time is up. As a result of determination at Step SN04, if the time is not up, the approval section 13 transmits, at Step SN05, an approval waiting notification indicating that the terminal is waiting for approver's approval of transmission of the e-mail to the sender terminal ST serving as the transmission source via the communication I/F 4. Thereafter, the approval section 13 repeats the above processing from Step SN03.

As a result of determination at Step SN03, if approval results of all the attached files requiring approval have been received, or if time is up as a result of determination at Step SN04, the approval section 13 stores, at Step SN06, the approval results in the file determination registers stored in the temporary storage 33, on the basis of the received approval results. In this operation, the approval result has a value indicating "approved" indicating that transmission of the file is permitted, such as "1", if the value indicating "approved" is stored for the file in all the approval destination registers. However, if a value indicating "not approved" is stored for the file in any of the approval destination registers, the approval result of the file is maintained at a value indicating "not approved" indicating that transmission of the file has not been approved, such as "0".

As a result of determination at Step SN01, if no file requiring approval exists, or after the approval results are stored at Step SN06, the controller 1 determines, at Step SN07, one of the destinations of the e-mail stored in the transmission information storage 31, as the processing target, under the control of the transmission control section 14.

Thereafter, at Step SN08, the controller 1 determines whether the destination serving as the processing target is a destination to which transmission is possible, under the control of the transmission control section 14. This can be executed by determining whether the transmission determination register of the destination stored in the temporary storage 33 has a value indicating that transmission is possible, for example, "00".

As a result of determination at Step SN08, if the destination serving as the processing target is a destination to which transmission is possible, the controller 1 transmits, at Step SN09, the e-mail stored in the transmission information storage 31 to the destination device RT serving as the destination via the communication I/F 5, under the control of the transmission control section 14. In this operation, the controller 1 may transmit a transmission completion notification indicating that transmission of the e-mail to the destination has been completed to the sender terminal ST being the transmission source via the communication I/F 4, under the control of the transmission control section 14.

Thereafter, at Step SN10, the controller 1 determines whether any unprocessed destination that has not yet been processed exists in one or more destinations in the e-mail stored in the transmission information storage 31. If any unprocessed destination exists, the controller 1 executes processing for the unprocessed destination by repeating the processing from Step SN07 described above.

By contrast, as a result of determination at Step SN08, if the destination serving as the processing target is not a destination to which transmission is possible, the controller 1 determines, at Step SN11, whether the destination serving as the processing target is a destination to which transmission is impossible, or whether any file impossible to transmit to the destination exists, under the control of the transmission control section 14. Whether the destination serving as the processing target is a destination to which transmission is impossible can be determined by, for example, determining whether the value indicating that transmission is impossible, such as "01", is set in the transmission determination register stored in the temporary storage 33, as the value indicating "transmission is possible/transmission is impossible/approval is required". In addition, whether any file transmission impossible to transmit to the destination exists can be determined by, for example, determining whether a value indicating that transmission is impossible, such as "01", is set in any of the file determination registers for the attached file stored in the temporary storage 33.

As a result of determination at Step SN11, if the destination serving as the processing target is a destination to which transmission is impossible, or if any file impossible to transmit to the destination exists, the controller 1 transmits, at Step SN12, a transmission impossible notification for the message to the destination to the sender terminal ST serving as the transmission source via the communication I/F 4, under the control of the transmission control section 14. Thereafter, the controller 1 proceeds to Step SN10 described above to determine whether any unprocessed destination exists.

By contrast, as a result of determination at Step SN11, if the destination serving as the processing target is not a destination to which transmission is impossible and no file impossible to transmit to the destination exists, the controller 1 determines, at Step SN13, whether any file requiring encryption exists, under the control of the transmission control section 14. This can be determined by, for example, determining whether "encryption is required" is stored in any of file determination registers for the attached files stored in the temporary storage 33. As a result of determination at Step SN13, if no files requiring encryption exist, the controller 1 proceeds to Step SN09, and transmits the e-mail stored in the transmission information storage 31 to the destination device RT serving as the destination, under the control of the transmission control section 14.

As a result of determination at Step SN13, if any file requiring encryption exists, the controller 1 executes, at Step SN14, encryption processing for all the attached files stored in the transmission information storage 31, including the attached file determined as a file requiring encryption, under the control of the confidentiality section 17. As a matter of course, the controller 1 may encrypt only the file determined as a file requiring encryption. The encrypted attached files are stored in the temporary storage 33. Thereafter, the controller 1 proceeds to Step SN09 described above, and transmits the e-mail stored in the transmission information storage 31 to the destination device RT serving as the destination, under the control of the transmission control section 14. However, in this case, with respect to the attached files, if encrypted attached files are stored in the temporary storage 33, the encrypted attached files stored in the temporary storage 33 are transmitted, not the attached files stored in the transmission information storage 31.

As described above, when processing is ended for all of one or more destinations in the e-mail stored in the transmission information storage 31, the controller 1 determines that no unprocessed determination exists as a result of determination at Step SN10 described above, and ends the transmission processing. The controller 1 can delete the e-mail stored in the transmission information storage 31 and information of the transmission determination registers relating to the e-mail and the like, when the transmission processing is finished.

(Operations and Effects)

As described above, the communication controller CT according to the second embodiment of the present invention includes: the rule storage 34 storing, at least, a transmission rule indicating whether approver's approval is required for transmission of the attached file; and the transmission decision section 16 deciding whether approver's approval is required for at least one attached file to be transmitted to the destination discriminated with the discrimination section 15 as a destination being at a confidential level requiring approval, on the basis of the transmission rule stored in the rule storage 34, wherein the transmission control section 14 transmits the attached file decided with the transmission decision section 16 as a file requiring approver's approval on condition that the approval section 13 has acquired approval. With this structure, it suffices to acquire approval only for attached files requiring approval on the basis of the transmission rule, instead of acquiring approval from the approver unconditionally whenever any attached file exists. This structure avoids occurrence of wasted processing time and waiting time, and enables shortening of the processing time required until transmission is finished. This structure also removes causing the approver to execute unnecessary approval work.

Herein, transmission rules are stored in the rule storage 34 in accordance with confidential words, and the transmission decision section 16 decides whether any confidential words in the transmission rules are included in the message to be transmitted to the destination, for example, the text of the e-mail, and decides that all the attached files to be transmitted to the destination require approver's approval, if any of the confidential words is included in the mail text. This structure enables decision as to whether approval is required by deciding whether the confidential word is included in the e-mail by simply text search through the mail text, and enables decision in short time.

In addition, the rule storage 34 may store transmission rules in accordance with the confidential properties of the attached files. In this case, the transmission decision section 16 decides whether each of at least one attached file to be transmitted to the destination matches with any of the confidential properties in the transmission rules and, if the attached file matches, decides that the attached file requires approver's approval. This structure enables decision as to whether approval is required by comparing the file property, such as the extension and the file name of the file, which enables decision of the data content of the file without reading the data content of the attached file, with the confidential property. This structure enables decision in short time.

In addition, the communication controller CT according to the second embodiment includes the confidentiality section 17, the transmission rules stored in the rule storage 34 includes a rule relating to the confidentiality processing method for the attached file, the transmission decision section 16 further decides whether the confidentiality processing method for the attached file is included in the transmission rules with respect to at least one attached file to be transmitted to the destination and, when it is included, decides that the attached file requires confidentiality, and the confidentiality section 17 executes confidentiality processing based on the confidentiality processing method included in the transmission rules stored in the rule storage 34, for the attached file decided with the transmission decision section 16 as a file requiring confidentiality. This structure further reduces the risk of leakage of the confidential file with disclosure restriction by subjecting the attached file to confidentiality processing, as required, before transmission, in addition to approver's approval of transmission.

The confidentiality processing method for the attached file included in the transmission rules stored in the rule storage 34 may include encryption of the attached file.

In addition, in the communication controller CT according to the second embodiment, the rule requiring approver's approval of transmission of the attached file included in the transmission rules stored in the rule storage 34 further includes specification information specifying the approver who should execute approval, the transmission decision section 16 further specifies the approver from whom approval should be acquired on the basis of the specification information included in the transmission rules stored in the rule storage 34, if the transmission decision section 16 decides that approver's approval is required, and the approval section 13 acquires approval of transmission from the approver specified with the transmission decision section 16. This structure enables acquisition of approval of transmission from a proper approver corresponding to the attached file, and further reduction in possibility of erroneous transmission of the confidential file with disclosure restriction.

The transmission control section 14 does not transmit the e-mail including at least one attached file, if approval of transmission has not been acquired from the approver with the approval section 13 with respect to any of the at least one attached file. Accordingly, no attached files are transmitted to the specific destination unless approval is acquired from all the corresponding approvers for all the files requiring approval. This structure enables reduction in possibility of erroneous transmission of the file with disclosure restriction for the destination.

Third Embodiment

The communication controller CT according to the second embodiment has a structure of deciding the confidential file that the propriety of transmission is to be inquired of the approver, without verifying the data content. By contrast, a communication controller CT according to a third embodiment of the present invention is configured to decide whether the attached file is a confidential file with reference to the data content of the attached file.

Configuration Example

The software configuration and the hardware configuration of the communication controller CT according to the third embodiment of the present invention are similar to those of the second embodiment.

However, the third embodiment is different from the second embodiment in the data rule table for each rule ID stored in the rule storage 34, and the file determination register for each file ID stored in the temporary storage 33. In addition, according to the present embodiment, a confidentiality item register is stored for each file ID in the temporary storage 33.

FIG. 20 is a diagram illustrating an example of a data rule table for each rule ID stored in the rule storage 34. In the third embodiment, the data rule table stores transmission rules corresponding to the data content of the attached files. Specifically, in the third embodiment, the file rule table includes items "processing is required" and "deletion is required", in addition to the items "approval is required", "encryption is required", and "transmission is impossible" in the same manner as the second embodiment, and provides them in association with the data content of the confidential file with disclosure restriction.

Herein, the data content can be a term and/or a numerical value used in the data indicating that the data is confidential data. For example, in a data file of Internet of things (IoT) data prepared with the robot controller RC and the like, a specific character string is included in the data content as model number of the manufacturing equipment RB. In addition, in a sales data file prepared in the sender terminal ST and/or the approver terminal AT, characters and symbols, such as "ten thousand yen" and the symbol of yen "Y", are included in the data content.

The items "processing is required" and "deletion is required" also provide the confidentiality processing method for the attached file, in the same manner as the items "encryption is required" and "transmission is impossible". The item "processing is required" describes a value indicating that processing, such as abstraction, is required for the data content in transmission of the message, if the processing is required, in the case where the confidential data content exist in the data content of the file. The item "deletion is required" describes a value indicating that deletion of the data content is required in transmission of the message, if the deletion is required, in the case where the confidential data content exist in the data content of the file.

FIG. 20 illustrates an example of the file rule table of the rule ID "47". For example, FIG. 20 illustrates that approver's approval is required for the model number "DR01" as data content of the confidential file, and describes the approver "preparer's superior". In addition, the file rule table illustrates that approver's approval is required for the actual value "X-axis position" as the data content of the confidential file, shows the approver "preparer's superior, approver of the preparation department of the attached file, and the like", and shows a value indicating that processing is required. The file rule table shows a value indicating that transmission of a message including an attached file is impossible for the preparation time "20:00 to 8:00 on the next day" as the data content of the confidential file.

FIG. 21 is a diagram illustrating another example of the data rule table for each rule ID stored in the rule storage 34. This is an example of a data rule table storing data contents for a plurality of transmission rules associated with one data content. In the data rule table as illustrated in FIG. 20, it is required to determine whether the data content of the attached file matches with each of all of a plurality of data contents illustrated in the table one by one. By contrast, with the data rule table of FIG. 21, if it is determined that one data content matches, the other data contents requiring determination can be immediately discriminated, and the speed of processing can be increased.

FIG. 21 is an example of a file rule table of the rule ID "47", and shows, for example, the preparation time "20:00 to 8:00 on the next day" as the data content of "transmission is impossible" for the model number "DR01" serving as the data content of the confidential file. In addition, the file rule table illustrates that, for example, encryption is required, approver's approval is required, and the approver is "preparer' superior, approver of the preparation department of the attached file, and the like". The file rule table also shows "X-axis position, Y-axis position, and the like" as the data content requiring processing, and "produced number" as the data content requiring deletion.

FIG. 22 is a diagram illustrating an example of the file determination register stored for each attached file in the temporary storage 33. The file determination register stores information "transmission is possible/transmission is impossible/approval is required", information indicating whether encryption is required, and information indicating "approved/not approved", in association with the file ID to discriminate each attached file, such as the file name, in the same manner as the second embodiment. In addition, in the third embodiment, information indicating whether confidentiality is required is further stored in association with the file ID. The information indicating whether confidentiality is required can also be stored as, for example, a 1-bit flag. The 1-bit flag indicates whether confidentiality is required in transmission of the attached file, for example, the flag value "0" indicating that confidentiality is not required is set as the initial value, and the flag value "1" indicates that confidentiality is required.

FIG. 23 is a diagram illustrating an example of a confidentiality item register stored for each attached file in the temporary storage 33. The confidentiality item register stores information indicating data requiring processing and data requiring deletion in association with the file ID. The information indicating data requiring processing is information specifying the data content decided as data requiring processing in the attached file on the basis of the data rule table. In the same manner, information indicating data requiring deletion is information specifying the data content decided as data requiring deletion in the attached file on the basis of the data rule table.

The transmission decision section 16 of the controller 1 decides whether each of data contents of at least one attached file to be transmitted to the destination matches with any of data contents in the transmission rules stored in the rule storage 34 and decides, if the data content matches, that the attached file requires approver's approval.

In addition, the transmission decision section 16 executes processing of deciding whether confidentiality is required for the data content of the attached file on the basis of the transmission rules stored in the rule storage 34, for at least one attached file to be transmitted to the destination. For example, if the transmission decision section 16 decides that the data content matches with any of data contents of the attached file in the file rule table stored in the rule storage 34, the transmission decision section 16 determines the confidentiality processing method stored in accordance with the data content. If "encryption is required" is set as the confidentiality processing method, the transmission decision section 16 can decide that the attached file requires encryption. If "transmission is impossible" is set as the confidentiality processing method, the transmission decision section 16 can decide that transmission of the attached file is prohibited. If "processing is required" is set as the confidentiality processing method, the transmission decision section 16 can decide that the data content part in the attached file requires processing. The transmission decision section 16 registers information indicating the data content part decided as part requiring processing in the confidentiality item register of the temporary storage 33. In the same manner, if "deletion is required" is set as the confidentiality processing method, the transmission decision section 16 can decide that the corresponding data content part in the attached file requires deletion. The transmission decision section 16 registers information indicating the data content part decided as part requiring deletion in the confidentiality item register of the temporary storage 33.

Operation Example

The following is an explanation of an operation example of the communication controller CT configured as described above. Herein, the operation example will be explained with an e-mail, as an example.

The operations of the communication controller CT according to the third embodiment are the same as the operations of the communication controller CT according to the second embodiment, except the file check processing at Step SM and the transmission processing at Step SN. However, although it suffices to execute at least one of the text check processing at Step SL and the file check processing at Step SM in the second embodiment, the file check processing at Step SM is indispensable in the third embodiment.

The following is an explanation of the file check processing and the transmission processing according to the third embodiment.

(1) Details of File Check Processing

FIG. 24 is a flowchart illustrating a processing procedure of file check processing executed at Step SM with the controller 1 under the control of the transmission decision section 16.

First, at Step SM01, the transmission decision section 16 decides one of attached files of the e-mail stored in the transmission information storage 31, as the processed file. Specifically, the transmission decision section 16 secures a file determination register in the temporary storage 33 for each of at least one attached file of the e-mail, and determines one attached file that has not yet been determined as to whether the file is a confidential file from the attached files, as the processed file.

Thereafter, at Step SM04, the transmission decision section 16 decides whether transmission of the processed file is impossible, with reference to the file rule table of the rule storage 34 specified with the rule ID of the transmission determination register stored in the temporary storage 33. This can be decided by deciding whether the data content of the processed file includes a part matching with any of data contents for which "transmission is impossible" is set as the confidentiality processing method in the file rule table.

As a result of decision at Step SM04, if transmission is impossible, the transmission decision section 16 sets, at Step SM05, a value indicating that transmission is impossible, for example, the value "01", in the file determination register of the processed file stored in the temporary storage 33.

By contrast, as a result of decision at Step SM04, if transmission is not impossible, the transmission decision section 16 decides, at Step SM06, whether approval is required for the processed file. This can be decided by deciding whether the data content of the processed file includes a part matching with any of data contents provided with the approver in the file rule table.

As a result of decision at Step SM06, if approval is required, the transmission decision section 16 sets, at Step SM07, a value indicating that approval is required, for example, the value "11", in the file determination register of the processed file stored in the temporary storage 33. In addition, the transmission decision section 16 secures an approval destination register for each of approvers provided for the data content of the file rule table in the temporary storage 33.

As a result of decision at Step SM06, if approval is not required, or after the processing at Step SM07, the transmission decision section 16 decides, at Step SM08, whether encryption is required for the processed file. This can be decided by deciding whether the data content of the processed file includes a part matching with any of data contents set as "data requiring encryption" in the file rule table.

As a result of determination at Step SM08, if encryption is required, the transmission decision section 16 stores, at Step SM09, a value indicating that encryption is required as encryption setting in the file determination register of the processed file stored in the temporary stored 33.

As a result of decision at Step SM08, if encryption is not required, or after the processing at Step SM09, the transmission decision section 16 decides, at Step SM11, whether the processed file requires confidentiality. This can be decided by deciding whether the data content of the processed file includes a part matching with any of data contents provided as "processing is required" or "deletion is required" in the file rule table.

As a result of determination at Step SM11, if processing is required, the transmission decision section 16 stores, at Step SM12, a value indicating that confidentiality is required in the file determination register of the processed file stored in the temporary stored 33. In addition, the transmission decision section 16 secures a confidentiality item register of the processed file in the temporary storage 33. Thereafter, if "processing is required" is set in the data content of the file rule table decided as matching data content in the decision processing at Step SM11, the transmission decision section 16 registers information indicating the data content part of the data requiring processing in the processed file in the confidentiality item register. In addition, in the decision processing at Step SM11, if "deletion is required" is set in the data content of the file rule table decided as matching data content, the transmission decision section 16 registers information indicating the data content part of the data requiring deletion in the processed file in the confidentiality item register.

As a result of decision at Step SM11, if confidentiality is not required, or after the processing at Step SM12, the transmission decision section 16 decides, at Step SM13, whether "approval is required", "encryption is required", or "confidentiality is required" has been set in the file determination register of the processed file stored in the temporary storage 33.

As a result of decision at Step SM11, if none of "approval is required", "encryption is required", and "confidentiality is required" has been set in the file determination register, the transmission decision section 16 sets, at Step SM03, a value indicating that transmission is possible, for example, "10", in the file determination register.

Thereafter, or as a result of decision at Step SM11, when either of "approval is required", "encryption is required", and "confidentiality is required" has been set in the file determination register, the transmission decision section 16 decides, at Step SM10, whether any unprocessed file that has not yet been decided as to whether the file is a confidential file exists in the file determination registers stored in the temporary storage 33. If any unprocessed file exists, the transmission decision section 16 repeats the above processing from Step SM01 to set the value of the file determination register for the unprocessed file.

As a result of decision at Step SM10, if no unprocessed file exists, the transmission decision section 16 ends the file check processing.

(2) Details of Transmission Processing

Figure 25:
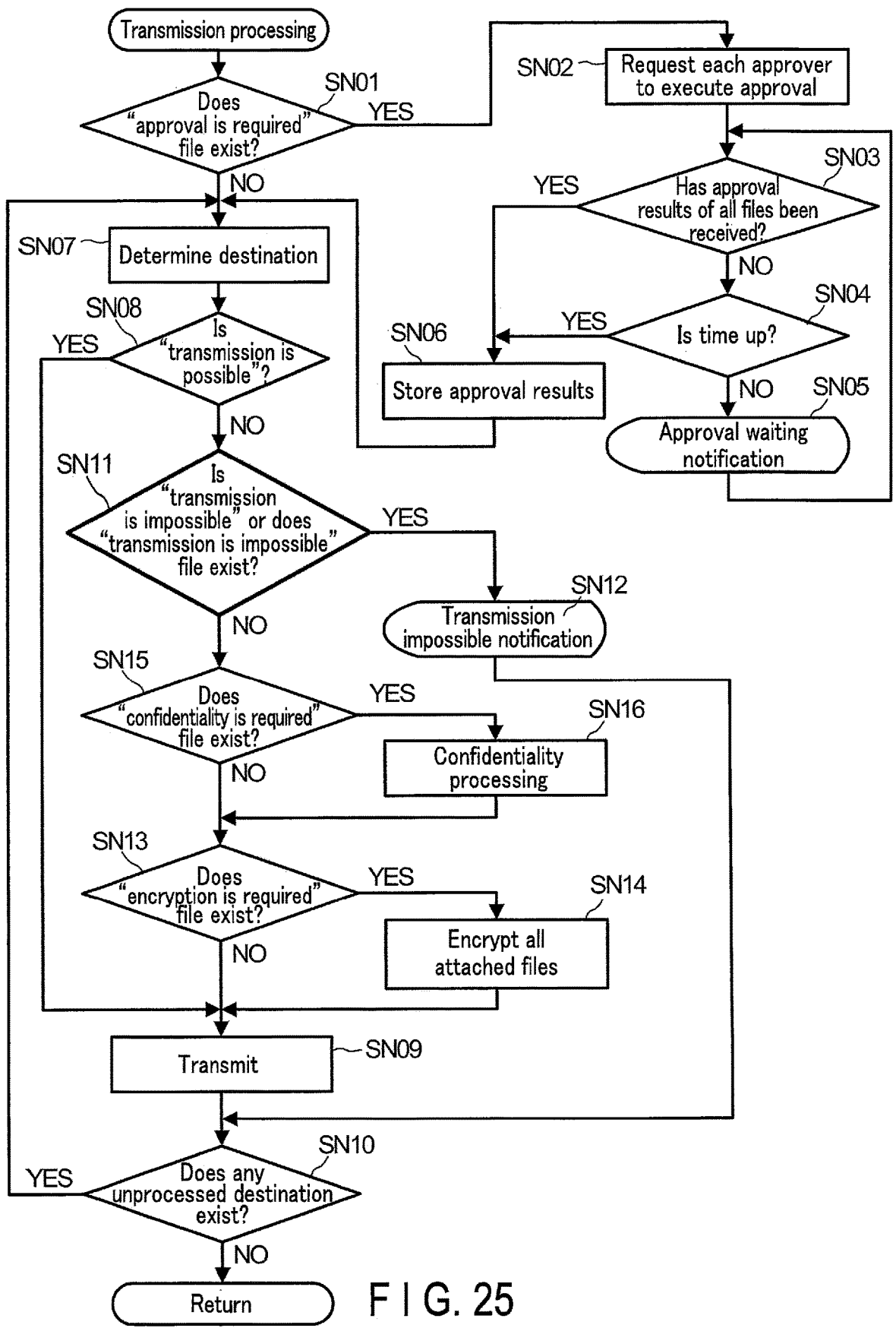
FIG. 25 is a flowchart illustrating a processing procedure of transmission processing in the processing procedure of e-mail transmission control executed with the communication control apparatus according to the third embodiment.

FIG. 25 is a flowchart illustrating a processing procedure of transmission processing executed at Step SN with the controller 1 under the control of the approval section 13 and the transmission control section 14.

The processing from Step SN0T to Step SN12 are similar to those of the second embodiment.

As a result of decision at Step SN11, if the destination serving as the processing target is not the destination of "transmission is impossible", and no files for which transmission is impossible exists, the controller 1 decides, at Step SN15, whether any file requiring confidentiality exists, under the control of the transmission control section 14. This can be executed by deciding whether "confidentiality is required" is stored in any of the file determination registers for the attached files stored in the temporary storage 33.

As a result of determination at Step SN15, if any file requiring confidentiality exists, the controller 1 executes, at Step SN16, confidentiality processing for the data content of the attached file decided as a file requiring confidentiality, under the control of the confidentiality section 17. In this operation, the confidentiality section 17 executes processing, such as abstraction, for the data content part requiring processing in the attached file, with reference to the confidentiality item register of the attached file decided as a file requiring confidentiality and stored in the temporary storage 33. The confidentiality section 17 also deletes the data content part of the attached file requiring deletion, with reference to the confidentiality item register.

Thereafter, or as a result of decision at Step SN15, if no file requiring confidentiality exists, the controller 1 proceeds to Step SN13. The processing at Step SN13 to Step SN14 is the same as that of the second embodiment.

(Operations and Effects)

As described above, in the communication controller CT according to the third embodiment of the present invention, the rule storage 34 stores transmission rules in accordance with data contents of the attached file, the transmission decision section 16 decides whether each data content of each of at least one attached file to be transmitted to the destination matches with any of data contents in the transmission rules, and, if the data content matches, decides that the attached file requires approver's approval. As described above, this structure decides whether the file is a confidential file requiring approver's approval by checking the data content of the attached file. Therefore, this structure further reduces the possibility of erroneous transmission of a file with disclosure restriction for the destination, in comparison with the case in which the data content is not checked. This structure also enables reduction in probability of causing the approver to approve a file requiring no approval.

In addition, according to the communication controller CT according to the third embodiment of the present invention, the confidentiality method for the attached file included in the transmission rules stored in the rule storage 34 includes processing and deletion of the data content of the attached file. As described above, this structure enables processing or deletion of part of the data content, as required, by checking the data content of the attached file. Attached files include a data file including part that cannot be disclosed to the outside, although it is useful data for various uses, such as IoT data prepared with the robot controller RC and the like. If transmission of such a data file is prohibited, useful data is kept idle without being used.

IoT data is data of Key-Value form, and includes information (such as property of the machine) associated with the machine itself and time-series data. For example, FIG. 26 is a diagram illustrating IoT data as an example of the attached file. In such IoT data, it can be provided whether the data is confidential according to the output source machine. For example, data relating to a specific machine tool is confidential, and data of a machine of a specific manufacturer is confidential. In addition, it can be provided whether the data is confidential according to which part of the data model of the IoT data the data corresponds to. For example, data corresponding to parameters of the machine is confidential, and specific actual values (such as coordinate positions of the X-axis and the Y-axis) included in the machine actual values are confidential. In addition, it can be provided whether the data is confidential according to the time axis. For example, data of a specific time zone is confidential. In accordance with confidential policy of the user company UC, various rules can be provided in the file rule table, for example, "approval is required" is set for information corresponding to the specific model number, and "transmission is impossible" is set for the produced number. This structure enables effective use of data, while data to be set confidential is kept confidential.

Fourth Embodiment

The communication controller CT according to each of the first to the third embodiments executes transmission, after determining whether to transmit a message including a confidential file with disclosure restriction for each of the destinations. This is effective for the cases of transmitting a message to destinations individually, such as an e-mail. By contrast, it is difficult to apply this structure to the cases where a message should be transmitted to a plurality of destinations simultaneously, like a chat. A communication controller CT according to a fourth embodiment of the present invention is configured to enable transmission of a message to a plurality of destinations simultaneously.

The fourth embodiment can be applied to any of the first to the third embodiments. The following is an explanation of the case of applying it to the third embodiment, as an example.

Configuration Example

The software configuration and the hardware configuration of the communication controller CT according to the fourth embodiment of the present invention are similar to those of the third embodiment, except that the destination table stored in the destination storage 32 is different from that of the third embodiment.

FIG. 27 is a diagram illustrating an example of the destination table. The destination table illustrates personal names indicating chat participants, such as "Mr./Ms. XX of B Company" serving as destination information, in the fourth embodiment. Although they are omitted in FIG. 27 for want of space, the destination table also registers application information indicating the application used for the chat, and information, such as the chat ID, serving as identification information of the destination in the application in association with each destination information. The application and the chat ID can be rewritten with the controller 1 of the communication controller CT when the chat is started.

Operation Example

The following is an explanation of an operation example of the communication controller CT according to the fourth embodiment of the present invention. Herein, the operation example will be explained with a chat, as an example.
(1) Reception of Chat Message Addressed to Outside When a chat message addressed to the outside of the user company UC is to be transmitted from the sender terminal ST, the controller 1 of the communication controller CT receives the chat message transmitted from the sender terminal ST via the communication I/F 4, and stores the chat message in the transmission information storage 31 of the data storage 3, under the control of the transmission information acquisition section 11. In this operation, the controller 1 stores the received chat message in the transmission information storage 31 in association with the sender terminal ID specifying the sender terminal ST of the transmission source or the sender ID specifying the sender. The chat message includes a chat text serving as a message text and information indicating the sender and the destination, and may further include an attached file. The information indicating the destination may include destination information, or may include application information and the chat ID.
(2) Chat Message Transmission Control FIG. 28 is a flowchart illustrating a processing procedure of chat message transmission control executed with the communication controller CT according to the fourth embodiment.
(2-1) Check Existence of Attached File At Step SA, the controller 1 of the communication controller CT determines whether the chat message stored in the transmission information storage 31 includes an attached file, under the control of the file existence determination section 12.
(2-2) Control in Absence of Attached File As a result of determination at Step SA, if no attached file exists, the controller 1 of the communication controller CT secures, at Step SE, a transmission determination register in the temporary storage 33 for each of one or more destinations of the chat message, and set information indicating that transmission is possible, for example, a flag value "10", in each transmission register, under the control of the discrimination section 15.
(2-3) Control in Presence of Attached File By contrast, as a result of determination at Step SA, if an attached file exists, the controller 1 of the communication controller CT executes processing of discriminating the confidential level of the destination as follows and setting the transmission determination register, the file determination register, and the confidentiality item register, under the control of the discrimination section 15 and the transmission decision section 16.

First, at Step SO, the discrimination section 15 acquires all of one or more destinations of the chat message stored in the transmission information storage 31 as the processing target, and secures a transmission determination register in the temporary storage 33 for each of the destinations.
(2-3-1) Destination Discrimination Thereafter, at Step SP, the discrimination section 15 discriminates whether a destination at confidential level 3 is included in the destinations serving as destinations being the processing target, with reference to the destination table stored in the destination storage 32.

As a result of determination at Step SP, if a destination at confidential level 3 is included in the destinations, the discrimination section 15 sets, at Step SG, information indicating that transmission is impossible, for example, a flag value "01", in each of the transmission determination registers of the destinations secured in the temporary storage 33.

By contrast, as a result of determination at Step SP, if no destination at confidential level 3 is included in the destinations, the discrimination section 15 discriminates, at Step SQ, whether a destination at confidential level 2 is included in the destinations serving as destinations being the processing target, with further reference to the destination table stored in the destination storage 32.

As a result of determination at Step SQ, if no destination at confidential level 2 is included in the destinations, that is, if all the destinations are at confidential level 1, the discrimination section 15 proceeds to Step SE described above, and sets information indicating that transmission is possible in the transmission determination register of each of the destinations secured in the temporary storage 33.

By contrast, as a result of determination at Step SQ, if no destination at confidential level 2 is included in the destinations, the discrimination section 15 sets, at Step SR, "confidentiality is required" in the transmission determination register of each of the destinations secured in the temporary storage 33. In the processing of setting of "confidentiality is required", the discrimination section 15 sets information indicating that approval is required, for example, a flag value "11", in the information "transmission is possible/transmission is impossible/approval is required" of each transmission determination register, and transcribes the information in the rule ID registered for the corresponding destination and stored in the destination table stored in the destination storage 32.

(2-3-2) File Discrimination

As described above, when a value indicating "transmission is possible/transmission is impossible/approval is required" is set in the transmission determination register for each of the one or more destinations, at Step SL, the controller 1 executes text check processing as described in the second embodiment, under the control of the transmission decision section 16. The text check processing is processing of discriminating whether approval of the attached file by the approver is required, on the basis of the message text of the chat, and setting the file determination register and the approval destination register.

Thereafter, at Step SM, the controller 1 executes file check processing as described in the third embodiment, under the control of the transmission decision section 16. The file check processing is processing of discriminating whether approval of the attached file by the approver is required, on the basis of the property information of the attached file of the chat message, and setting the file determination register, the confidentiality item register, and the approval destination register.

(2-3-3) Transmission Processing

After the processing at Step SE, Step SG, or Step SM described above, the controller 1 of the communication controller CT executes, at Step SS, transmission processing of transmitting the chat message stored in the transmission information storage 31 under the control of the approval section 13 and the transmission control section 14. After the transmission processing is finished, the controller 1 ends the processing of the chat message transmission control.

Figure 29:
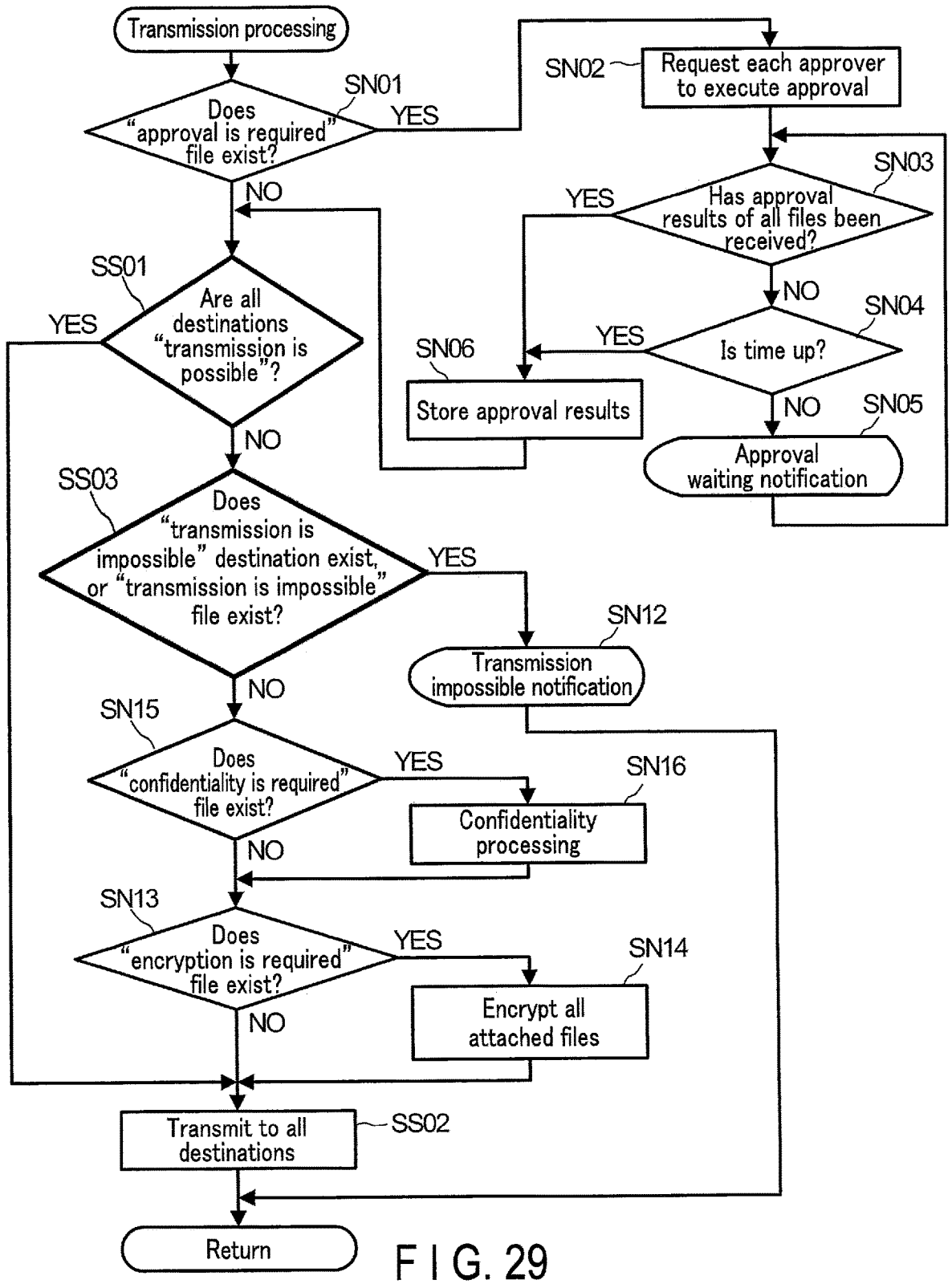
FIG. 29 is a flowchart illustrating a processing procedure of transmission processing in the processing procedure illustrated in FIG. 28.

FIG. 29 is a flowchart illustrating a processing procedure of transmission processing executed at Step SS with the controller 1 under the control of the approval section 13 and the transmission control section 14.

The processing at Step SN0T to Step SN06 are similar to those of the third (second) embodiment.

As a result of decision at Step SN01, if no file requiring approval exists, or after the approval result is stored at Step SN06 described above, the controller 1 determines, at Step SS01, whether all the destinations of the chat message stored in the transmission information storage 31 are destinations to which transmission is possible, under the control of the transmission control section 14. This can be executed by determining whether all the transmission determination registers of one or more destinations stored in the temporary storage 33 have a value indicating that transmission is possible, for example, "00".

As a result of determination at Step SS01, if all the destinations are destinations to which transmission is possible, the controller 1 transmits, at Step SS02, the chat message stored in the transmission information storage 31 to the destination devices RT serving as the destinations via the communication I/F 5, under the control of the transmission control section 14. The destination devices RT may be a messenger server device determined with the application used for the chat. When the transmission is executed, the controller 1 may transmit a transmission completion notification indicating that transmission of the chat message to the destinations has been completed to the sender terminal ST being the transmission source via the communication I/F 4, under the control of the transmission control section 14. Thereafter, the controller 1 ends the transmission processing.

By contrast, as a result of determination at Step SS01, if all the destinations are not destinations to which transmission is possible, the controller 1 determines, at Step SS03, whether the destinations include any destination to which transmission is impossible, or whether the attached files include any file impossible to transmit, under the control of the transmission control section 14. Whether the destinations include any destination to which transmission is impossible can be determined by, for example, determining whether the value indicating that transmission is impossible, such as "01", is set in any of the transmission determination registers of the destinations stored in the temporary storage 33, as the value indicating "transmission is possible/transmission is impossible/approval is required". In addition, whether the attached files include any file impossible to transmit can be determined by, for example, determining whether a value indicating that transmission is impossible, such as "01", is set in any of the file determination registers for the attached files stored in the temporary storage 33.

As a result of determination at Step SS03, if the destinations include any destination to which transmission is impossible, or if the attached files include any file impossible to transmit, the controller 1 proceeds to Step SN12 in the same manner as the third embodiment. In addition, as a result of determination at Step SS03, if the destinations include no destination to which transmission is impossible, and if the attached files include no file impossible to transmit, the controller 1 proceeds to Step SN15. Step SN13 to Step SN16 are the same as described in the third embodiment.

(Operations and Effects)

As described above, in the communication controller CT according to the fourth embodiment of the present invention, if the discrimination section 15 discriminates any one of one or more destinations as a destination being at a confidential level requiring approval, and if approval has not been acquired with the approval section 13 from the approver for transmission of all of at least one attached file, the transmission control section 14 does not execute transmission of the chat message including at least one attached file to all of one or more destinations. As described above, if any one of destinations requires approval, the message is not transmitted to any of the destinations unless approver's approval is acquired. This structure enables reduction in possibility of inappropriate transmission of a confidential file with disclosure restriction to a party to which disclosure of the file is originally prohibited, in the cases where the message should be transmitted to a plurality of destinations simultaneously.

Other Embodiments

The first to the fourth embodiments have been described with an example of message transmission to the destination device RT existing outside the user company UC, but the destination may exist inside the user company UC. For example, the first to the fourth embodiments are also applicable to the cases where each department has files disclosure of which is prohibited to the other departments.

In addition, each of the embodiments has a structure in which two levels are set for approver's approval, that is, "approval is required" and "approval is not required", but the level "approval is required" may be further divided into multiple levels, and different approvers may be set according to the levels.

In addition, in each of the embodiments, the tables used for determining the confidential level of the destination and/or whether approval is required for the file are prepared by the manager or the like of the communication controller and stored in the data storage 3 in advance. Each of the tables may be stored, for example, a file server FS connected to the premises network NW1, and the controller 1 may acquire data of the table by accessing the file server FS or the like via the communication I/F 4 as required. Each of the tables may be prepared by an artificial intelligence (AI) learned with inputs of message including the message text and attached files and outputs of the confidential level of the destination and information as to whether approval is required for the file, instead of being prepared by the manager or the like. For example, in learning of information as to whether approval is required for the file, training data can be information as to whether the manager or the like decides that the file requires approval of the superior.

In addition, AI can determine whether approval is required for the file according to the destination, instead of using, with the controller 1, the table stored in the data storage 3. Specifically, a message serving as a determination target may be input to the AI to determine whether approval is required for each of one or more files for each of destinations of the message. The AI is learned with inputs of message including an attached file and outputs of information as to whether approval is required for the file for each of the destinations of the message.

The second and the third embodiments have a structure of executing encryption of the attached file as required for each of the destinations, but a result of encryption of the attached file may be stored in advance in the temporary storage 33, and the encryption result may be read for each of the destinations as required. With this structure, it suffices that encryption should be executed only once, and the speed of processing is increased.

The third and the fourth embodiments have a structure in which transmission of the message is prohibited if any file impossible to transmit exists in transmission processing, but only the file impossible to transmit may be deleted and a message including files possible to transmit may be transmitted.

The embodiments of the present invention have been described in detail, but the explanations described above are only illustration of examples of the present invention in all respects. Various improvement and/or modification are possible as a matter of course without departing from the scope of the present invention. Specifically, any specific structures according to the embodiments may be properly adopted in implementation of the present invention.

In short, the present invention is not limited to the embodiments described above, but can be embodied with various modifications of constituent elements within a range not departing from the gist of the invention. In addition, various inventions can be made by proper combinations of the constituent elements disclosed in the embodiments described above. For example, some constituent elements may be deleted from the constituent elements disclosed in the embodiment. In addition, constituent elements of different embodiments may be properly used in combination.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

What is claimed is:

1. A communication control apparatus comprising:
processing circuitry configured to implement
a file existence determination section configured to determine, when a message is transmitted from an information processing apparatus to one or more destinations via a network, whether the message include at least one attached file;
an approval section configured to acquire approval of transmission of said at least one attached file from an approver, when the file existence determination section processing circuitry has determined that the message to be transmitted includes said at least one attached file;
a transmission control section configured to transmit the message including said at least one attached file to said one or more destinations, on condition that the approval section has received approval of transmission of said at least one attached file from the approver;
a level storage configured to store confidential levels indicating disclosure levels for confidential information for predetermined destinations;
a discrimination section configured to discriminate each of the one or more destinations as to whether the one or more destinations are at a confidential level requiring approver's approval when the at least one attached file is transmitted, based on the confidential levels stored in the level storage, when the file existence determination section has determined that the message to be transmitted includes said at least one attached file, wherein the transmission control section transmits said at least one attached file for which approval has been acquired from the approver with the approval section at least to the one or more destinations discriminated with the discrimination section as a destination being at the confidential level requiring approval;
a rule storage configured to store at least a transmission rule indicating whether approval by the approver is required for transmission of the at least one attached file; and
a transmission decision section configured to decide whether approval by the approver is required, based on the transmission rule stored in the rule storage, for said at least one attached file to be transmitted to the one or more destinations discriminated with the discrimination section as the destination being at the confidential level requiring approval, wherein
the transmission control section transmits the at least one attached file decided with the transmission decision section as an attached file requiring approval by the approver, on condition that approval has been acquired with the approval section
the rule storage stores the transmission rule in accordance with confidential properties of the at least one attached file, the confidential properties being values specified from file property information and enabling specification of data contents of the at least one attached file without determining the data contents of the at least one attached file included in the message, items "approval is required", "encryption is required" and "transmission is impossible" being provided in association with the confidential properties with which the at least one attached file may be a confidential file with disclosure restriction, the items being provided for each of the at least one attached file, and the transmission decision section decides whether the at least one attached file matches any of the confidential properties in the transmission rule, for each of said at least one attached file to be transmitted to the one or more destinations, and decides that the at least one attached file requires approval by the approver when the attached file matches any of the confidential properties.

2. The communication control apparatus according to claim 1, wherein the transmission control section does not transmit the message including said at least one attached file, when approval of transmission has not been acquired from the approver with the approval section for any of said at least one attached file.

3. The communication control apparatus according to claim 1, wherein the rule storage stores the transmission rule in accordance with confidential words, and the transmission decision section decides whether any of the confidential words in the transmission rule is included in the message to be transmitted to the destination, and decides that all of attached files to be transmitted to the destination require approval by the approver when any of the confidential words is included in the message.

4. The communication control apparatus according to claim 1, wherein the rule storage stores the transmission rule in accordance with data contents of the at least one attached file, the transmission decision section decides whether data content of the at least one attached file matches any of the data contents in the transmission rule, for each data content of said at least one attached file to be transmitted to the one or more destinations, and decides that the at least one attached file requires approval by the approver when the data content of the at least one attached file matches any of the data content in the transmission rule.

5. The communication control apparatus according to claim 4, wherein in the transmission rule stored in the rule storage, a rule requiring approval by the approver for transmission of the at least one attached file further includes specification information specifying the approver who should execute approval, the transmission decision section further specifies the approver from whom approval should be acquired, based on the specification information included in the transmission rule stored in the rule storage, when the transmission decision section decides that approval by the approver is required, and the approval section acquires approval of the transmission from the approver specified with the transmission decision section.

6. The communication control apparatus according to claim 1, further comprising:

a confidentiality section configured to execute confidentiality processing, wherein the transmission rule stored in the rule storage includes a rule relating to a confidentiality processing method for data contents of the at least one attached file, the transmission decision section further decides whether the confidentiality processing method for the at least one attached file is included in the transmission rule for said at least one attached file to be transmitted to the one or more destinations, and decides that the at least one attached file requires confidentiality when the confidentiality processing method is included, and the confidentiality section executes the confidentiality processing based on the confidentiality processing method for the data contents included in the transmission rule stored in the rule storage for the at least one attached file decided with the transmission decision section as a file for which confidentiality of the data contents is required.

7. The communication control apparatus according to claim 6, wherein the confidentiality processing method for the at least one attached file included in the transmission rule stored in the rule storage includes at least one of encryption of the at least one attached file, processing or deletion of the data contents of the at least one attached file, and prohibition of transmission of the at least one attached file.

8. The communication control apparatus according to claim 1, wherein in the transmission rule stored in the rule storage, a rule requiring approval by the approver for transmission of the at least one attached file further includes specification information specifying the approver who should execute approval, the transmission decision section further specifies the approver from whom approval should be acquired, based on the specification information included in the transmission rule stored in the rule storage, when the transmission decision section decides that approval by the approver is required, and the approval section acquires approval of the transmission from the approver specified with the transmission decision section.

9. The communication control apparatus according to claim 1, wherein the transmission control section does not transmit the message including said at least one attached file to any of said one or more destinations, when the discrimination section discriminates any one of the one or more destinations as a destination being at the confidential level requiring approval, and when approval has not been acquired with the approval section from the approver for transmission of all of said at least one attached file.

10. A communication control method of controlling transmission of a message including an attached file, when the message is transmitted from an information processing apparatus to one or more destinations via a network, comprising;

with a computer, determining whether the message to be transmitted from the information processing apparatus include at least one attached file;

acquiring approval of transmission of said at least one attached file from an approver, when the message to be transmitted includes said at least one attached file;

transmitting the message including said at least one attached file to said one or more destinations, on condition that approval of transmission of said at least one attached file has been received from the approver;

storing, in a level storage, confidential levels indicating disclosure levels for confidential information for predetermined destinations;

discriminating each of the one or more destinations as to whether the one or more destinations are at a confidential level requiring approver's approval when the at least one attached file is transmitted, based on the confidential levels stored in the level storage, when the message to be transmitted includes said at least one attached file, wherein the method includes transmitting said at least one attached file for which approval has been acquired from the approver with the approval section at least to the one or more discriminated destinations as a destination being at the confidential level requiring approval;

storing, in a rule storage, at least a transmission rule indicating whether approval by the approver is required for transmission of the at least one attached file;

decide whether approval by the approver is required, based on the transmission rule stored in the rule storage, for said at least one attached file to be transmitted to the one or more discriminated destinations as the destination being at the confidential level requiring approval; and transmitting the at least one decided attached file as an attached file requiring approval by the approver, on condition that approval has been acquired, wherein the rule storage stores the transmission rule in accordance with confidential properties of the at least one attached file, the confidential properties being values specified from file property information and enabling specification of data contents of the at least one attached file without determining the data contents of the at least one attached file included in the message, items "approval is required", "encryption is required", and "transmission is impossible" being provided in association with the confidential properties with which the at least one attached file may be a confidential file with disclosure restriction, the items being provided for each of the at least one attached file, and the computer decides whether the at least one attached file matches any of the confidential properties in the transmission rule, for each of said at least one attached file to be transmitted to the one or more destinations, and decides that the at least one attached file requires approval by the approver when the attached file matches any of the confidential properties.

11. A non-transitory computer readable medium storing a computer program that causes a processor included in a communication control apparatus, to:

determine whether a message to be transmitted from an information processing apparatus include at least one attached file;

acquire approval of transmission of said at least one attached file from an approver, when the message to be transmitted includes said at least one attached file; and transmit the message including said at least one attached file to said one or more destinations, on condition that approval of transmission of said at least one attached file has been received from the approver;

store, in a level storage, confidential levels indicating disclosure levels for confidential information for predetermined destinations;

discriminate each of the one or more destinations as to whether the one or more destinations are at a confidential level requiring approver's approval when the at least one attached file is transmitted, based on the confidential levels stored in the level storage, when the message to be transmitted includes said at least one attached file, wherein the method includes transmitting said at least one attached file for which approval has been acquired from the approver with the approval section at least to the one or more discriminated destinations as a destination being at the confidential level requiring approval;

store, in a rule storage, at least a transmission rule indicating whether approval by the approver is required for transmission of the at least one attached file;

decide whether approval by the approver is required, based on the transmission rule stored in the rule storage, for said at least one attached file to be transmitted to the one or more discriminated destinations as the destination being at the confidential level requiring approval; and transmit the at least one decided attached file as an attached file requiring approval by the approver, on condition that approval has been acquired, wherein the rule storage stores the transmission rule in accordance with confidential properties of the at least one attached file, the confidential properties being values specified from file property information and enabling specification of data contents of the at least one attached file without determining the data contents of the at least one attached file included in the message, items "approval is required", "encryption is required", and "transmission is impossible" being provided in association with the confidential properties with which the at least one attached file may be a confidential file with disclosure restriction, the items being provided for each of the at least one attached file, and the processor decides whether the at least one attached file matches any of the confidential properties in the transmission rule, for each of said at least one attached file to be transmitted to the one or more destinations, and decides that the at least one attached file requires approval by the approver when the attached file matches any of the confidential properties.

* * * * *